(12) United States Patent
Asahi et al.

(10) Patent No.: US 10,399,309 B2
(45) Date of Patent: *Sep. 3, 2019

(54) ANTIREFLECTION FILM, POLARIZING PLATE, COVER GLASS, AND IMAGE DISPLAY DEVICE, AND METHOD FOR PRODUCING ANTIREFLECTION FILM

(71) Applicant: FUJIFILM Corporation, Tokyo (JP)

(72) Inventors: Miho Asahi, Kanagawa (JP); Ayako Matsumoto, Kanagawa (JP); Shuntaro Ibuki, Kanagawa (JP); Makoto Uchimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 15/280,052

(22) Filed: Sep. 29, 2016

(65) Prior Publication Data
US 2017/0015087 A1    Jan. 19, 2017

Related U.S. Application Data

(63) Continuation of application No. PCT/JP2015/060278, filed on Mar. 31, 2015.

(30) Foreign Application Priority Data

Mar. 31, 2014 (JP) .................................. 2014-074784
Mar. 31, 2014 (JP) .................................. 2014-074785
(Continued)

(51) Int. Cl.
*B32B 27/20* (2006.01)
*B29D 11/00* (2006.01)
(Continued)

(52) U.S. Cl.
CPC ........ *B32B 27/20* (2013.01); *B29D 11/00644* (2013.01); *B29D 11/00788* (2013.01);
(Continued)

(58) Field of Classification Search
CPC ............ B32B 27/20; B32B 27/30–308; B32B 2264/102; B32B 2457/20; B32B 2551/00;
(Continued)

(56) References Cited

U.S. PATENT DOCUMENTS 5,929,130 A * 7/1999 Suzuki .................... B29C 33/40
                                                                    264/401
10,082,605 B2 * 9/2018 Ibuki ....................... G02B 1/118
(Continued)

FOREIGN PATENT DOCUMENTS

CN        102162864 A        8/2011
CN        102702966 A       10/2012
(Continued)

OTHER PUBLICATIONS

Office Action issued by the State Intellectual Property Office of the People's Republic of China on Apr. 20, 2017, in connection with corresponding Chinese Patent Application No. 201580018148.0.
(Continued)

*Primary Examiner* — Stephone B Allen
*Assistant Examiner* — Adam W Booher
(74) *Attorney, Agent, or Firm* — Edwards Neils LLC; Jean C. Edwards, Esq.

(57) ABSTRACT

An antireflection film includes: a substrate; and an antireflection layer formed with a composition containing metal oxide particles having surface hydroxyl groups as particles for forming a moth eye structure, and two compounds having (meth)acryloyl groups, where the antireflection layer contains a binder resin including at least one of a structure derived from the two (meth)acryloyl groups, and the moth
(Continued)

eye structure has an irregular shape formed with the metal oxide particles on a surface on a side opposite to an interface on the substrate side, and in the irregular shape of the antireflection layer, B/A is a ratio between a distance A between peaks of adjacent convex portions and a distance B between a center between peaks of the adjacent convex portions and a concave portion is 0.5 or greater.

26 Claims, 1 Drawing Sheet

(30) Foreign Application Priority Data

| Jan. 20, 2015 | (JP) | ................................ | 2015-008713 |
| Mar. 23, 2015 | (JP) | ................................ | 2015-060079 |

(51) Int. Cl.
| B32B 27/30 | (2006.01) |
| G02B 1/118 | (2015.01) |
| G02B 5/30 | (2006.01) |
| G02B 5/02 | (2006.01) |

(52) U.S. Cl.
CPC ........ *B29D 11/00865* (2013.01); *B32B 27/30* (2013.01); *G02B 1/118* (2013.01); *G02B 5/0294* (2013.01); *G02B 5/3033* (2013.01); *B32B 2264/102* (2013.01); *B32B 2457/20* (2013.01); *B32B 2551/00* (2013.01); *G02B 5/0226* (2013.01)

(58) Field of Classification Search
CPC ........ B29D 11/00644; B29D 11/00788; B29D 11/00865; G02B 1/10; G02B 1/11; G02B 1/111; G02B 1/118; G02B 5/02; G02B 5/0205; G02B 5/021; G02B 5/0215; G02B 5/0221; G02B 5/0226; G02B 5/0231; G02B 5/0294; G02B 5/3033
See application file for complete search history.

(56) References Cited

U.S. PATENT DOCUMENTS

| 2006/0269733 | A1* | 11/2006 | Mizuno | .................... | C09D 4/00 |
| | | | | | 428/304.4 |
| 2008/0118669 | A1* | 5/2008 | Inoue | ...................... | G02B 1/111 |
| | | | | | 428/1.31 |
| 2015/0079348 | A1* | 3/2015 | Mizoshita | ............ | G02B 5/0226 |
| | | | | | 428/148 |
| 2016/0299260 | A1* | 10/2016 | Ibuki | ...................... | G02B 1/118 |

FOREIGN PATENT DOCUMENTS

| JP | H05-013021 A | 1/1993 |
| JP | H06-331802 A | 12/1994 |
| JP | H07-104103 A | 4/1995 |
| JP | 2007-286226 A | 11/2007 |
| JP | 2009-139796 A | 6/2009 |
| JP | 2012-145748 A | 8/2012 |

OTHER PUBLICATIONS

International Search Report issued in connection with International Patent Application No. PCT/JP2015/060278 dated Jun. 16, 2015.
Written Opinion issued in connection with International Patent Application No. PCT/JP2015/060278 dated Jun. 16, 2015.

* cited by examiner

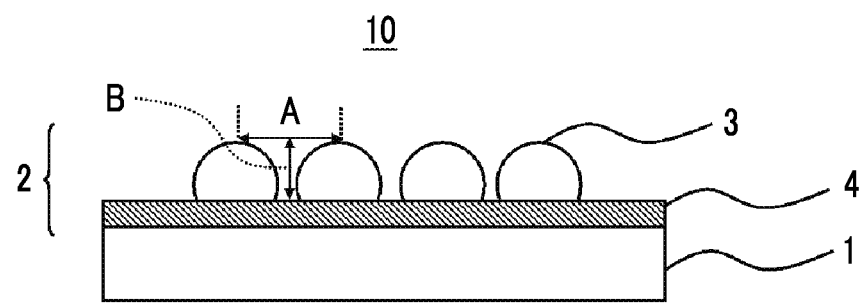

ANTIREFLECTION FILM, POLARIZING PLATE, COVER GLASS, AND IMAGE DISPLAY DEVICE, AND METHOD FOR PRODUCING ANTIREFLECTION FILM

CROSS REFERENCE TO RELATED APPLICATION

This is a continuation of International Application No. PCT/JP2015/060278 filed on Mar. 31, 2015, which was published under Article 21(2) in Japanese, and claims priority from Japanese Patent Application No. 2014-074784 filed on Mar. 31, 2014, Japanese Patent Application No. 2014-074785 filed on Mar. 31, 2014, Japanese Patent Application No. 2015-008713 filed on Jan. 20, 2015 and Japanese Patent Application No. 2015-060079 filed on Mar. 23, 2015, the entire disclosures of which are incorporated herein by reference in their entirety.

BACKGROUND OF THE INVENTION

1. Field of the Invention

The present invention relates to an antireflection film, a polarizing plate, a cover glass, and an image display device, and a method for producing an antireflection film.

2. Description of the Related Art

An antireflection film may be provided in an image display device such as a cathode ray tube display device (CRT), a plasma display (PDF), an electroluminescent display (ELD), a fluorescent display (VFD), a field-emission display (FED), and a liquid crystal display device (LCD), in order to prevent decrease in contrast and reflected glare of the image, due to the reflection of external light on the display surface. In addition, in addition to the image display device, an antireflection function may be provided due to the antireflection film.

As the antireflection film, an antireflection film having a fine uneven shape in which a cycle is a wavelength of visible light or less on the substrate surface, and an antireflection film having a so-called a moth eye structure is known. According to the moth eye structure, a refractive index gradient layer of which a refractive index continuously changes from the air to a bulk material inside the substrate in a pseudo manner is made, and the reflection of light can be prevented.

In JP2009-139796A, as the antireflection film having a moth eye structure, an antireflection film having an uneven structure which is produced by applying a coating liquid containing a transparent resin monomer and fine particles on a transparent substrate, curing the coating liquid, forming a transparent resin in which the fine particles are dispersed, and thereafter etching the transparent resin is disclosed.

In JP1995-104103A (JP-H07-104103A), an antireflection member which is exposed in a state in which ultra fine particles are fixed to a remaining portion of a hardened binder layer by performing dry-etching of a hardened binder layer containing ultra fine particles provided on a substrate is disclosed.

In JP1993-13021A (JP-H05-13021A), production of an antireflection body to which ultra fine particles are fixed by an $SiO_2$ thin film obtained by coating a glass substrate with a coating liquid including tetraethoxysilane and ultra fine particles and performing baking, such that tetraethoxysilane is decomposed is disclosed.

SUMMARY OF THE INVENTION

However, it has been found that antireflection members disclosed in JP2009-139796A, JP1995-104103A (JP-H07-104103A), and JP1993-13021A (JP-H05-13021A) have a problem that particles fall out due to strong stress being applied to a moth eye structure formed with particles.

It has been found that the antireflection film disclosed in JP2009-139796A has a problem that, if a high pressure is applied to a moth eye structure formed with particles in a thickness direction, particles crack and thus an antireflection function is lost.

The present inventors have conducted research on these problems and used metal oxide particles having high indentation hardness and a small amount of hydroxyl groups on the surface, as particles for forming a moth eye structure. Though durability with respect to pressure in a thickness direction was increased, the present inventors had a new problem that, dispersibility of particles in a binder resin used in an antireflection layer was decreased, the particles in the binder resin agglomerated, and thus haze of the antireflection layer increased or reflectivity increased.

A first object of the invention is to provide an antireflection film that has a moth eye structure on a surface in which the pencil hardness in a moth eye structure is high, and particles do not fall out even if strong stress is applied to a moth eye structure, a polarizing plate, a cover glass, and an image display device that include this antireflection film, and a method for producing an antireflection film.

A second object of the invention is to provide an antireflection film that has a moth eye structure on a surface, in which durability with respect to pressure of a moth eye structure in a thickness direction is high, reflectivity is low, and haze is low, a polarizing plate, a cover glass, and an image display device that include this antireflection film, and a method for producing an antireflection film.

The present inventors have diligently conducted research and found to the first object can be achieved by using a specific component as a material for forming an antireflection layer having a moth eye structure.

That is, the first embodiment of the invention has constitutions of [1] to [14] below.

The present inventors have diligently conducted research and found that the second object can be achieved by using metal oxide particles having high indentation hardness and a small amount of hydroxyl groups on the surface as particles for forming a moth eye structure and using a resin having a hydroxyl group as a binder resin of an antireflection layer.

That is, the second embodiment of the invention has constitutions of [2-1] to [2-18] below.

[1]

An antireflection film, comprising:

a substrate; and an antireflection layer formed with a composition for forming an antireflection layer containing (A), (B), and (C) below, in which the antireflection layer includes a binder resin including at least one of a structure derived from (B) below and a structure derived from (C) below and has a moth eye structure having an irregular shape formed with metal oxide particles (A) below on a surface on a side opposite to an interface on the substrate side, and in the irregular shape of the antireflection layer, B/A which is a ratio between a distance A between peaks of adjacent convex portions and a distance B between a center between peaks of the adjacent convex portions and a concave portion is 0.5 or greater.

(A) metal oxide partials having hydroxyl groups on surfaces thereof and having an average primary particle diameter of 50 nm to 380 nm.

(B) a compound having a (meth)acryloyl group as a polymerizable group or a polymerizable group that is constituted from only atoms selected from hydrogen atoms, carbon atoms, nitrogen atoms and oxygen atoms and is other than a (meth)acryloyl group, having three or more polymerizable groups in one molecule, and having a weight-average molecular weight of 1,000 or less.

(C) a compound having a (meth)acryloyl group, having a silicon atom to which at least one of a hydroxyl group and a hydrolyzable group is directly bonded, and having a weight-average molecular weight of 300 to 1,000.

[2]
The antireflection film according to [1], in which the compound (C) is a compound having four or more carbon atoms between a carbon atom that constitutes a carbonyl group in the (meth)acryloyl group and a silicon atom to which at least one of a hydroxyl group and a hydrolyzable group is directly bonded.

[3]
The antireflection film according to [1] or [2], in which a ratio of the number of (meth)acryloyl groups to the number of the silicon atoms to which at least one of a hydroxyl group and a hydrolyzable group is directly bonded in the compound (C) is 1.1 to 3.0.

[4]
The antireflection film according to any one of [1] to [3], in which the compound (C) is a compound having a urethane bond between a carbon atom constituting a carbonyl group in the (meth)acryloyl group and the silicon atom to which at least one of a hydroxyl group and a hydrolyzable group is directly bonded.

[5]
The antireflection film according to any one of [1] to [4], in which a ratio of a content mass of the (C) to a sum of a content mass of the (B) and a content mass of the (C) is 0.2 to 0.8.

[6]
The antireflection film according to any one of [1] to [5], in which the metal oxide particles (A) are metal oxide particles that are surface-modified with a compound having a (meth)acryloyl group.

[7]
The antireflection film according to any one of [1] to [5], in which the metal oxide particles (A) in the composition for forming the antireflection layer are surface-modified with the compound (C).

[8]
The antireflection film according to any one of [1] to [7], in which the metal oxide particles are silica particles.

[9]
The antireflection film according to any one of [1] to [8], in which the metal oxide particles are baked silica particles.

[10]
The antireflection film according to any one of [1] to [9], further comprising: a hardcoat layer between the substrate and the antireflection layer.

[11]
A polarizing plate comprising: a polarizer; and at least one protective film that protects the polarizer, in which at least one of the at least one protective film is an antireflection film according to any one of [1] to [10].

[12]
A cover glass comprising: the antireflection film according to any one of [1] to [10] as a protective film.

[13]
An image display device comprising: the antireflection film according to any one of [1] to [10], or the polarizing plate according to [11].

[14]
A method for producing an antireflection film that has a substrate and an antireflection layer, comprising:
a step of coating the substrate with a composition for forming an antireflection layer containing (A), (B), and (C) below and hardening (B) and (C) below,
in which the antireflection layer has a moth eye structure having an irregular shape formed with metal oxide particles of (A) below on a surface on a side opposite to an interface on the substrate side, and
in the irregular shape of the antireflection layer, B/A which is a ratio between a distance A between peaks of adjacent convex portions and a distance B between a center between peaks of the adjacent convex portions and a concave portion is 0.5 or greater.

(A) metal oxide particles having hydroxyl groups on surfaces thereof and having an average primary particle diameter of 50 nm to 380 nm.

(B) a compound having three or more (meth)acryloyl groups in one molecule, and having a weight-average molecular weight of 1,000 or less, and in a case where the compound (B) has a polymerizable group other than a (meth)acryloyl group, the polymerizable group is a polymerizable group that is constituted from only atoms selected from hydrogen atoms, carbon atoms, nitrogen atoms, and oxygen atoms.

(C) a compound having a (meth)acryloyl group, having a silicon atom to which at least one of a hydroxyl group and a hydrolyzable group is directly bonded, and having a weight-average molecular weight of 300 to 1,000.

[2-1]
An antireflection film comprising: a substrate; and an antireflection layer containing a binder resin and metal oxide particles having an average primary particle diameter of 50 nm to 250 nm,
in which, in a surface of the metal oxide particles, an amount of hydroxyl groups is $1.00 \times 10^{-1}$ or less,
indentation hardness of the metal oxide particles is 400 MPa or greater,
the binder resin is a resin having a hydroxyl group, and
the antireflection layer has a moth eye structure having an irregular shape formed with the metal oxide particles on a surface on a side opposite to an interface on the substrate side.

[2-2]
The antireflection film according to [2-1], in which in the irregular shape of the antireflection layer, B/A which is a ratio between a distance A between peaks of adjacent convex portions and a distance B between a center between peaks of the adjacent convex portions and a concave portion is 0.5 or greater,

[2-3]
The antireflection film according to [2-1] or [2-2], in which only metal oxide particles having an average primary particle diameter of 50 nm to 250 nm, as the metal oxide particles are contained.

[2-4]
The antireflection film according to any one of [2-1] to [2-3], in which the metal oxide particles are silica particles.

[2-5]
The antireflection film according to any one of [2-1] to [2-4], in which the metal oxide particles are baked silica particles.

[2-6]
The antireflection film according to any one of [2-1] to [2-5], in which the metal oxide particles are baked silica particles that are surface-modified with a compound having a (meth)acryloyl group.

[2-7]
The antireflection film according [2-2], in which a half-width of the distance A in distribution is 200 nm or less.

[2-8]
The antireflection film according to any one of [2-1] to [2-7], in which the binder resin is a resin obtained by polymerizing a polymerizable compound having at least one of a group having an ethylenically unsaturated double bond and an epoxy group as a polymerizable group.

[2-9]
The antireflection film according to [2-8], in which a hydroxyl group equivalent of one molecule of the polymerizable compound is 1 to 10,000.

[2-10]
The antireflection film according to any one of [2-1] to [2-9], further comprising: a hardcoat layer between the substrate and the antireflection layer.

[2-11]
A polarizing plate comprising: a polarize; and at least one protective film that protects a polarizer, in which at least one of the at least one protective film is the antireflection film according to any one of [2-1] to [2-10].

[2-12]
A cover glass comprising: the antireflection film according to any one of [2-1] to [2-10], as a protective film.

[2-13]
An image display device comprising: the antireflection film according to any one of [2-1] to [2-10] or the polarizing plate according to [2-11].

[2-14]
A method for producing an antireflection film that has a substrate and an antireflection layer containing a binder resin and metal oxide particles having an average primary particle diameter of 50 nm to 250 nm, comprising:
a step of coating the substrate with a composition for forming an antireflection layer containing a polymerizable compound for forming a binder resin having a polymerizable functional group and metal oxide particles having an average primary particle diameter of 50 nm to 250 nm,
in which, in a surface of the metal oxide particles, an amount of hydroxyl groups is $1.00 \times 10^{-1}$ or less,
indentation hardness of the metal oxide particles is 400 MPa or greater,
the binder resin is a resin having a hydroxyl group, and
the antireflection layer has a moth eye structure having an irregular shape formed with the metal oxide particles on a surface on a side opposite to an interface on the substrate side.

[2-15]
The antireflection film according to any one of [2-1], [2-2], [2-4] to [2-10], in which both of metal oxide particles having an average primary particle diameter of 120 nm to 250 nm and metal oxide particles having an average primary particle diameter of 50 nm or greater and less than 120 nm, as the metal oxide particles are contained.

[2-16]
The antireflection film according to [2-15], in which, in the metal oxide particles having an average primary particle diameter of 50 nm or greater and less than 120 nm, an amount of hydroxyl groups is $1.00 \times 10^{-1}$ or less, and indentation hardness is 400 MPa or greater.

[2-17]
The antireflection film according to [2-15], in which, in the metal oxide particles having an average primary particle diameter of 50 nm or greater and less than 120 nm, an amount of hydroxyl groups is greater than $1.00 \times 10^{-1}$ or indentation hardness is less than 400 MPa.

[2-18]
The antireflection film according to any one of [2-15] to [2-17], in which the metal oxide particles having an average primary particle diameter of 50 nm or greater and less than 120 nm are contained in a frequency of 2 to 5 times compared with the metal oxide particles having an average primary particle diameter of 120 nm to 250 nm.

According to the first embodiment of the invention, it is possible to provide an antireflection film that has a moth eye structure on a surface, in which a pencil hardness in a moth eye structure is high, and particles do not fall out even if strong stress is applied to a moth eye structure, a polarizing plate, a cover glass, and an image display device that include this antireflection film, and a method for producing an antireflection film.

According to the second embodiment of the invention, it is possible to provide an antireflection film that has a moth eye structure on a surface, in which durability of a moth eye structure with respect to pressure in a thickness direction is high, reflectivity is low, and haze is low, a polarizing plate, a cover glass, and an image display device that include this antireflection film, and a method for producing an antireflection film.

BRIEF DESCRIPTION OF THE DRAWINGS

FIG. 1 is a cross-sectional view illustrating an example of an antireflection film according to first and second embodiments of the invention.

DESCRIPTION OF THE PREFERRED EMBODIMENTS

Hereinafter, preferred embodiments of the invention are described in detail. The descriptions of constitutional requirements described below is based on representative embodiments of the invention, but the invention is not limited to the embodiment.

In a case where numerical values in the present specification indicate values of physical properties and values of characteristics, the descriptions "(numerical value 1) to (numerical value 2)" means "(numerical value 1) or greater and (numerical value 2) or less".

"(Meth)acrylate" indicates at least one of acrylate and methacrylate, "(methlacryl" indicates at least one of acryl and methacryl, and "(meth)acryloyl" indicates at least one of acryloyl and methacryloyl.

First Embodiment of the Invention

[Antireflection Film]
An antireflection film according to a first embodiment of the invention is an antireflection film including:
a substrate; and
an antireflection layer formed with a composition for forming an antireflection layer containing (A), (B), and (C) below, the antireflection layer includes a binder resin including at least one of a structure derived from (B) below and a structure derived from (C) below and has a moth eye structure having an irregular shape formed with metal oxide particles (A) below on a surface on a side opposite to an interface on the substrate side, and in the irregular shape of the antireflection layer, B/A which is a ratio between a distance A between peaks of adjacent convex portions and a distance B between a center between peaks of the adjacent convex portions and a concave portion is 0.5 or greater.

(A) metal oxide particles having hydroxyl groups on surfaces thereof and having an average primary particle diameter of 50 nm to 380 nm.

(B) a compound having a (meth)acryloyl group as a polymerizable group or a polymerizable group that is constituted from only atoms selected from hydrogen atoms, carbon atoms, nitrogen atoms and oxygen atoms and is other than a (meth)acryloyl group, having three or more polymerizable groups in one molecule, and having a weight-average molecular weight of 1,000 or less.

(C) a compound having a (meth)acryloyl group, having a silicon atom to which at least one of a hydroxyl group and a hydrolyzable group is directly bonded, and having a weight-average molecular weight of 300 to 1,000.

Hereinafter, the antireflection film of the present embodiment is described.

An example of a preferable embodiment of the antireflection film of the present embodiment is illustrated in FIG. 1.

An antireflection film 10 of FIG. 1 has a substrate 1 and an antireflection layer 2. The antireflection layer 2 has a moth eye structure having an irregular shape formed with metal oxide particles 3 on a side opposite to an interface on the substrate 1 side.

The antireflection layer 2 includes the metal oxide particles 3 and a binder resin 4.

(Moth Eye Structure)

The antireflection layer provided on one or both surfaces of the substrate of the antireflection film according to the present embodiment has a moth eye structure having an irregular shape formed with metal oxide particles (A).

Here, the moth eye structure refers to a surface obtained by processing a substance (material) for suppressing reflection of light and a structure with a periodic fine structure pattern. Particularly, in a case of the purpose of suppressing reflection of visible light, the moth eye structure refers to a structure with a fine structure pattern in a cycle of less than 780 nm. It is preferable that a cycle of the fine structure pattern is less than 380 nm, since a tint of reflection light disappears. It is preferable that a cycle is 100 nm or greater, since a fine structure pattern can be recognized with light having a wavelength of 380 nm and thus antireflection properties are excellent. Whether there is a moth eye structure can be checked by observing a surface shape by a scanning-type electron microscope (SEM), an atomic force microscope (AFM), and the like and examining whether the fine structure pattern is formed.

With respect to the irregular shape of the antireflection layer of the antireflection film according to the present embodiment, B/A which is a ratio of the distance A between peaks of adjacent convex portions and the distance B between a center between peaks of the adjacent convex portions and a concave portion is 0.5 or greater. If B/A is 0.5 or greater, a depth of the concave portion with respect to the distance between convex portions becomes great, it is possible to make a refractive index inclined layer in which a refractive index is steadily changed from the air to the inside of the antireflection layer, and thus it is possible to reduce the reflectivity.

B/A can be controlled by a volume ratio of the binder resin and the metal oxide particles in the antireflection layer after hardening. Therefore, it is important to appropriately design a formulation ratio of the binder resin and the metal oxide particles. In a process of producing a moth eye structure, the binder resin may permeate or volatilize to the substrate, such that a volume ratio of the binder resin and the metal oxide particles in the antireflection layer becomes different from the formulation ratio in the composition for forming the antireflection layer in some cases. Therefore, it is important to appropriately set matching with the substrate.

It is preferable that the metal oxide particles for forming convex portions are evenly spread in a high filling rate, in order to reduce the reflectivity by causing B/A to be 0.5 or greater. It is important that the filling rate is not too high, since if a filling rate is too high, adjacent particles come into contact with each other, so as to make B/A of the irregular structure be small. In this point of view, it is preferable that the content of the metal oxide particles for forming convex portions is adjusted so that the entire antireflection layer becomes even. The filling rate can be measured with area occupancy of particles positioned on the most superficial side when the metal oxide particles for forming the convex portions are observed from the surface by a SEM or the like, and thus the filling rate is preferably 30% to 95%, more preferably 40% to 90%, and even more preferably 50 to 85%.

Hereinafter, the measuring method of B/A which is a ratio of the distance A between peaks of adjacent convex portions and the distance B between a center of the peaks of adjacent convex portions and the concave portion is described in detail.

B/A can be measured by sectional SEM observation of the antireflection film. A cross section is formed by cutting a specimen of the antireflection film with a microtome and observed with a SEM in appropriate magnification (about 5,000 times). For easier observation, an appropriate process such as carbon vapor deposition or etching may be performed in the specimen. When lengths are calculated at 100 points in which a distance between peaks of adjacent convex portions is set to be A in the interface formed by the air and the specimen, a distance between a straight line connecting peaks of adjacent convex portions and a concave portion which is a point at which the perpendicular bisector thereof reaches the particles or the binder resin in the plane which is perpendicular to the substrate surface including peaks of adjacent convex portions is set to be B, B/A is calculated with an average value of B/A.

In the SEM picture, with respect to all the captured unevenness portions, the lengths of the distance A between peaks of adjacent convex portions and the distance B between centers of peaks of adjacent convex portions and concave portions may not be correctly measured. However, in this case, the lengths are calculated by paying attention to the convex portions and the concave portions which are shown on the front side of the SEM image.

It is required that the lengths of the concave portions are measured in the same depth as the particles for forming two adjacent convex portions of which the length are measured in the SEM image. If the lengths of the concave portions are measured by setting the distance to the particles shown in the more front side to be B, it may be assumed that B is small.

B/A is preferably 0.6 or greater, more preferably 0.7 or greater, and even more preferably 0.8 or greater. Since a moth eye structure can be strongly fixed, and thus abrasion resistance is excellent, B/A is preferably 0.9 or less.

(Metal Oxide Particles)

Metal oxide particles for forming a moth eye structure of the antireflection layer are described.

The metal oxide particles (A) contained in the composition for forming the antireflection layer are metal oxide particles having hydroxyl groups on the surface and having an average primary particle diameter of 50 nm to 380 nm.

In the obtained antireflection layer, a portion or all of the hydroxyl groups on the surfaces of the metal oxide particles (A) may disappear by condensation reaction with hydroxyl groups (silanol groups) directly bonded to silicon atoms of the compound (C) or silanol groups obtained by hydrolyzing hydrolyzable groups directly bonded to silicon atoms. Since the metal oxide particles are strongly bonded to the compound (C) by this condensation reaction, it is more difficult for metal oxide particles to fall out even if strong stress is applied, and thus the condensation reaction is preferable.

The average primary particle diameter of the metal oxide particles (A) is 50 nm to 380 nm, preferably 100 nm to 320 nm, and more preferably 120 nm to 250 nm. It is preferable that the average primary particle diameter of the metal oxide particles is 50 nm or greater, since agglomeration of the particles is prevented. In view of suppression of haze, the average primary particle diameter is preferably 380 nm or less, more preferably 300 nm or less, and further particularly preferably 220 nm or less.

The average primary particle diameter of the metal oxide particles refers to a 50% particle diameter of accumulation of the volume average particle diameters. In a case where the average primary particle diameters of the metal oxide particles included in the antireflection layer are measured, the average primary particle diameters can be measured by an electron micrograph. For example, a slice TEM image of the antireflection film is photographed, respective diameters of 100 primary particles are measured, and the volumes thereof are calculated, so as to cause the 50% particle diameter of the accumulation of the volume average particle diameters to be the average primary particle diameter. In a case where a particle is not a spherical shape, an average value of a long diameter and a short diameter is considered as a diameter of the primary particle.

According to the present embodiment, an amount of the hydroxyl groups of the particle surface is defined as follows. The amount of the hydroxyl groups is measured by solid $^{29}$Si NMR ($^{29}$Si CP/MAS). The amount of the hydroxyl groups of the particle surface when signal strength of metal elements M on the surfaces of the metal oxide particles which are bonded to n hydroxyl groups is set to be Qn, an amount of the hydroxyl groups is set to be a sum of existing Qn×n/(square of radius of particle (unit: nm)). For example, in a case where particles are silica (having a particle radius R), silicon (signal strength: Q0) which is bonded to four atoms of neutral oxygen, silicon (signal strength: Q1) which is bonded to three atoms of neutral oxygen and one hydroxyl group, silicon (signal strength: Q2) which is bonded to two atoms of neutral oxygen and two hydroxyl groups exist, the amount of the hydroxyl groups on the particle surfaces is $(Q1 \times 1 + Q2 \times 2)/R^2$. In a case of silica, a signal providing the signal strength Q2 has a chemical shift of −91 to −94 ppm, a signal providing the signal strength Q1 has a chemical shift of −100 to −102 ppm, a signal providing the signal strength Q0 has a chemical shift of −109 to −111 ppm.

It is preferable that there are more hydroxyl groups on the surface, since a reaction amount increases. The reaction amount is preferably $1.00 \times 10^{-4}$ to $4.00 \times 10^{-1}$, more preferably $5.00 \times 10^{-4}$ to $3.50 \times 10^{-1}$, and even more preferably $1.00 \times 10^{-3}$ to $3.00 \times 10^{-1}$.

The metal oxide particles (A) are preferably metal oxide particles surface-modified with a compound having a (meth) acryloyl group. The preferable embodiment thereof is called a first embodiment. The compound having a (meth)acryloyl group is preferably a silane coupling agent having a (meth) acryloyl group. A surface treatment is preferably a silane coupling treatment.

It is preferable to use metal oxide particles surface-modified with a compound having a (meth)acryloyl group, since a (meth)acryloyl group of the compound (C) and a (meth)acryloyl group jof of the compound (B) are cross-linked to each other, metal oxide particles are strongly fixed to the binder resin, pencil hardness of the obtained moth eye structure increases, and thus it is more difficult for the metal oxide particles to fall out even if strong stress is applied.

As specific examples and preferable examples of the surface treatment method, it is possible to refer to disclosure in "0119" to "0147" of JP2007-298974A.

According to the first embodiment, the content of (C) is preferably 0.01 to 6.0 in a mass ratio with respect to the content (A).

In the composition for forming the antireflection layer, an embodiment in which the metal oxide particles (A) are surface-modified with the compound (C) is also preferable. This preferable embodiment is called a second embodiment. According to this embodiment, as described above, the metal oxide particles are strongly bonded to the compound (C) by condensation reaction of hydroxyl groups on the surfaces of the metal oxide particles (A) with the hydroxyl groups (silanol groups) directly bonded to the silicon atoms of the compound (C) or silanol groups in which hydrolyzable groups directly bonded to the silicon atoms are hydrolyzed. The embodiment is preferable, since the (meth) acryloyl group of the compound (C) modified on the surface of the metal oxide particle (A) is cross-linked to a (meth) acryloyl group of the compound (B), metal oxide particles are strongly fixed to the binder resin, the pencil hardness of the obtained moth eye structure increases, and it is difficult for the metal oxide particles to fall out, even if adhesiveness of the particles is checked after application of stress in the manner of rubbing with an eraser after a pencil hardness test. This second embodiment has an advantage of obtaining an effect in the same level by using a smaller amount of the compound (C) than the first embodiment.

According to the second embodiment, the content of (C) modified on the surface of (A) is preferably 0.001 to 0.3 in a mass ratio with respect to the content of (A).

Examples of the metal oxide particles include silica particles, titania particles, zirconia particles, and antimony pentoxide particles. However, silica particles are preferable since silica particles have refractive indexes closer to those of many binders, haze is not likely to occur, and thus a moth eye structure is easily formed.

The metal oxide particles are particularly preferably baked silica particles.

The baked silica particles can be produced by well-known techniques of obtaining silica particles by hydrolyzing and condensing a hydrolyzable silicon compound in an organic solvent including water and a catalyst and baking the silica particles. For example, it is possible to refer to JP2003-176121A and JP2008-137854A.

The silicon compound which is a raw material for producing baked silica particles is not particularly limited. Examples thereof include a chlorosilane compound such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino)propyltrimethoxysilane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyltriacetoxysilane, phenyltriacetoxysilane, dimethyldiacetoxysilane, diphenyldiacetoxysilane, and trimethylacetoxysilane; and a silanol compound such as dimethylsilanediol, diphenylsilanediol, and trimethylsilanol. Among the silane compounds exemplified above, an alkoxysilane compound is particularly preferable since an alkoxysilane compound is easily obtained, and the obtained baked silica particles do not include a halogen atom as impurities. As a preferable embodiment of the baked silica particles according to the present embodiment, it is preferable that the content of the halogen atom is substantially 0%, and a halogen atom is not detected.

The baking temperature is not particularly limited, and the baking temperature is preferably 800 to 1,300° C., and more preferably 1,000° C. to 1,200° C.

The shape of particles is most preferably a spherical shape, but the shape thereof may be a shape other than the spherical shape such as an undefined shape.

The silica particles may be crystalline or may be amorphous.

As the metal oxide particles, commercially available particles may be baked to be used. As the specific examples, IPA-ST-L (average primary particle diameter: 50 nm, silica sol manufactured by Nissan Chemical Industries, Ltd.), IPA-ST-ZL (average primary particle diameter: 80 nm, silica sol manufactured by Nissan Chemical Industries, Ltd.), SNOWTEX MP-1040 (average primary particle diameter: 100 nm, silica manufactured by Nissan Chemical Industries, Ltd.), SNOWTEX MP-2040 (average primary particle diameter 200 nm, silica manufactured by Nissan Chemical Industries. Ltd.), EPOSTAR KE-P10 (average primary particle diameter: 150 nm, amorphous silica manufactured by Nippon Shokubai Co., Ltd.), EPOSTAR KE-P20 (average primary particle diameter: 200 nm, amorphous silica manufactured by Nippon Shokubai Co., Ltd.), and ASFP-20 (average primary particle diameter: 200 nm, alumina manufactured by NEC Corporation) can be preferably used. If requirements according to the present specification are satisfied, commercially available particles may be used without change.

The content of the metal oxide particles (A) with respect to the total solid content in the composition for forming the antireflection layer is preferably 10 mass % to 95 mass %, more preferably 35 mass % to 90 mass %, and even more preferably 65 mass % to 85 mass %.

(Binder Resin)

The binder resin of the antireflection layer is described.

The binder resin of the antireflection layer include at least one of a structure derived from (B) below in the composition for forming the antireflection layer and a structure derived from (C) below in the composition for forming the antireflection layer.

(B) a compound having a (meth)acryloyl group as a polymerizable group or a polymerizable group that is constituted from only atoms selected from hydrogen atoms, carbon atoms, nitrogen atoms and oxygen atoms and is other than a (meth)acryloyl group, having three or more polymerizable groups in one molecule, and having a weight-average molecular weight of 1,000 or less.

(C) a compound having a (meth)acryloyl group, having a silicon atom to which at least one of a hydroxyl group and a hydrolyzable group is directly bonded, and having a weight-average molecular weight of 300 to 1,000.

Here, the structure derived from (B) is a structure obtained by a reaction of a polymerizable group of the compound (B), and a structure derived from (C) is a structure obtained by a reaction of at least any one of a (meth)acryloyl group, a hydroxyl group, or a hydrolyzable group of the compound (C).

<Compound (B)>

The compound (B) contained in the composition for forming the antireflection layer is described.

The compound (B) is a compound having a (meth)acryloyl group as a polymerizable group or a polymerizable group other than a (meth)acryloyl group that is constituted with only atoms selected from a hydrogen atom, a carbon atom, a nitrogen atom, and an oxygen atom, having three or more polymerizable groups in one molecule, and having a weight-average molecular weight of 1,000 or less.

Specific examples of the polymerizable group other than a (meth)acryloyl group that is constituted with only atoms selected from a hydrogen atom, a carbon atom, a nitrogen atom, and an oxygen atom include a group represented by any one of Formulae (Q-1) to (Q-14) below, but the invention is not limited thereto.

(Q-1)
(Q-2)
(Q-3)
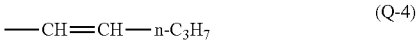
(Q-4)
(Q-5)
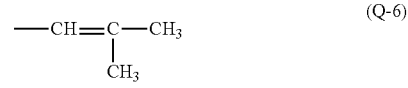
(Q-6)
(Q-7)
(Q-8)
(Q-9)
(Q-10)
(Q-11)
(Q-12)

—N=C=O       (Q-13)

—NH₂         (Q-14)

As the polymerizable group included in the compound (B), a (meth)acryloyl group is preferable.

The compound (B) preferably has 3.0 or more polymerizable groups, more preferably 4.0 or more polymerizable groups, and even more preferably 5.0 or more polymerizable groups, in one molecule.

Specific examples of the compound (B) are (meth)acrylic acid esters of alkylene glycol, (meth)acrylic acid diesters of polyoxyalkylene glycol, (meth)acrylic acid esters of alcohol, (meth)acrylic acid esters of adducts of ethylene oxide or propylene oxide, epoxy (meth)acrylates, urethane (meth)acrylates, and polyester (meth)acrylates.

Among these, esters of alcohol and (meth)acrylic acid are preferable, esters of polyhydric alcohol and (meth)acrylic acid are particularly preferable. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, urethane acrylate, polyester polyacrylate, and caprolactone-modified tris(acryloxyethyl) isocyanurate.

The weight-average molecular weight of the compound (B) is 1,000 or less, preferably 100 to 800, and more preferably 200 to 700. It is preferable that the weight-average molecular weight of the compound (B) is 1,000 or less, since a cross-linked density can be increased, in view of hardness.

The weight-average molecular weight is a value indicated in terms of polystyrene, by using a device and a column as below, by gel permeation chromatography (GPC) measured in the conditions below, and by a tetrahydrofuran (THF) solvent and differential refractometer detection.
[Device name] TOSOH HLC-8220GPC
[Column] A column obtained by connecting three items of TOSOH TSK gel Super HZM-H (4.6 mm×15 cm) is used.
[Column temperature] 25° C.
[Sample concentration] 0.1 mass %
[Current speed] 0.35 ml/min
[Calibration curve] A calibration curve obtained from seven samples of TSK standard polystyrene manufactured by TOSOH Corporation, of which Mw=2,800,000 to 1,050.

The content of (B) with respect to the total solid content in the composition for forming the antireflection layer is preferably 1.0 mass % to 70.0 mass %, more preferably 2.5 mass % to 42.0 mass %, and even more preferably 6.0 mass % to 20.0 mass %.

<Compound (C)>

The compound (C) contained in the composition for forming the antireflection layer is described.

The compound (C) is a compound having a (meth)acryloyl group, having a silicon atom to which at least one of a hydroxyl group and a hydrolyzable group is directly bonded, and having a weight-average molecular weight of 300 to 1,000.

The hydrolyzable group of the compound (C) is preferably an alkoxy group, preferably an alkoxy group having 1 to 3 carbon atoms, and most preferably a methoxy group.

Since both of the hydroxyl group and the hydrolyzable group easily react with the (meth)acryloyl group in one molecule, the compound (C) is preferably a compound having four or more carbon atoms between carbon atoms constituting the carbonyl group in the (meth)acryloyl group and silicon atoms to which at least one of the hydroxyl group and the hydrolyzable group is directly bonded.

In the compound (C), the number of carbon atoms between carbon atoms constituting the carbonyl group in the (meth)acryloyl group and silicon atoms to which at least one of the hydroxyl group and the hydrolyzable group is directly bonded is more preferably 4 to 12 and even more preferably 6 to 10.

Specific examples of such a compound include the followings.

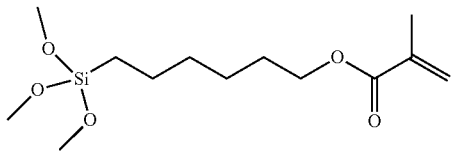

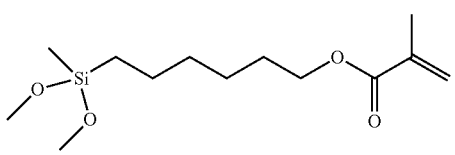

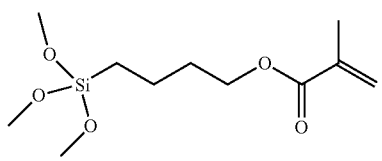

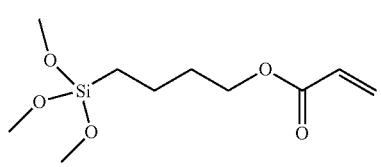

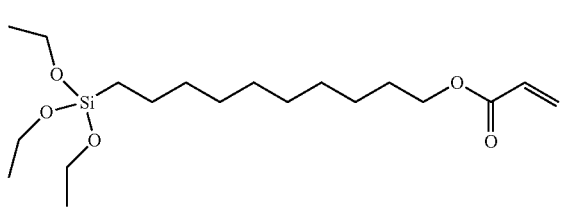

In view of causing one or more (meth)acryloyl groups in one molecule to react with the compound (B), the ratio of the number of the (meth)acryloyl groups to the number of the silicon atoms to which at least one of a hydroxyl group and a hydrolyzable group is directly bonded in the compound (C) is preferably 1.1 to 3.0.

Specific examples of such a compound include the followings.

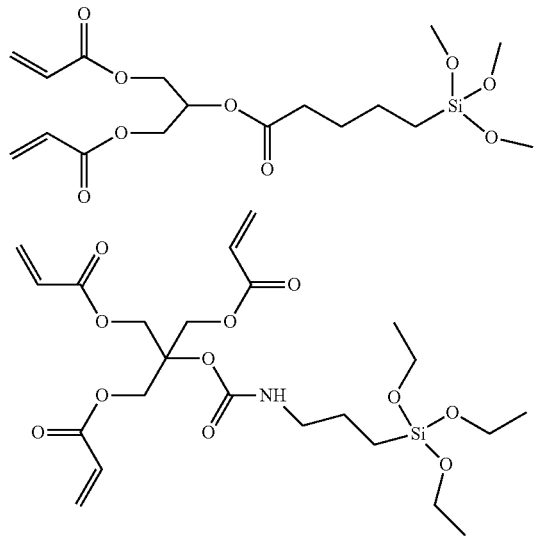

In view of securing film hardness of the binder, the compound (C) is preferably a compound having an urethane bond between carbon atoms constituting the carbonyl group in the (meth)acryloyl group and silicon atoms to which at least one of the hydroxyl group and the hydrolyzable group is directly bonded.

Specific examples of such a compound include the followings.

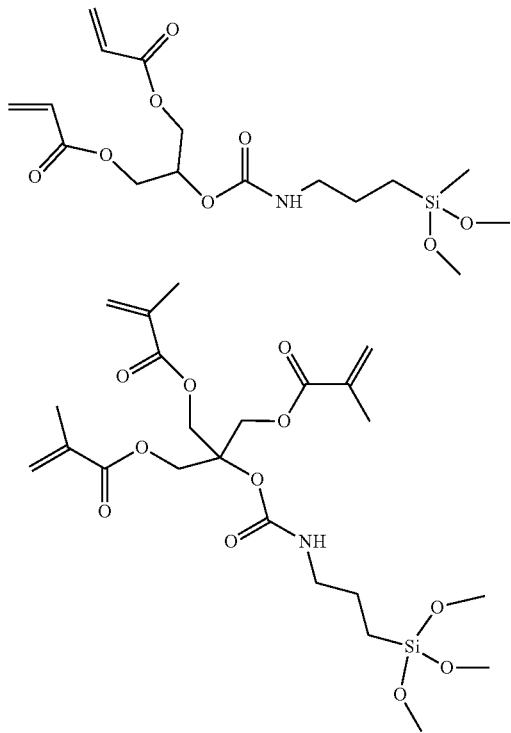

The weight-average molecular weight of the compound (C) is 300 to 1,000, preferably 300 to 800, and more preferably 300 to 600. It is preferable that the weight-average molecular weight of the compound (C) is 300 to 1,000, since both of the hydroxyl group and the hydrolyzable group easily react with the (meth)acryloyl group in the molecule and a moth eye shape can be easily obtained.

The weight-average molecular weight is a value indicated in terms of polystyrene, by using a device and a column as below, by gel permeation chromatography (GPC) measured in the conditions below, and by a tetrahydrofuran (THF) solvent and differential refractometer detection.

[Device name] TOSOH HLC-8220GPC

[Column] A column obtained by connecting three items of TOSOH TSK gel Super HZM-H (4.6 mm×15 cm) is used.

[Column temperature] 25° C.

[Sample concentration] 0.1 mass %

[Current speed] 0.35 ml/min

[Calibration curve] A calibration curve obtained from seven samples of TSK standard polystyrene manufactured by TOSOH Corporation, of which Mw=2,800,000 to 1,050.

The number of the (meth)acryloyl groups in the compound (C) is preferably 1 to 8 and more preferably 2 to 4 in one molecule.

The content of (C) with respect to the total solid content in the composition for forming the antireflection layer is preferably 1.0 mass % to 70.0 mass %, more preferably 2.5 mass % to 42.0 mass %, and even more preferably 6.0 mass % to 20.0 mass %.

Specific examples of the compound (C) are provided below, but the present embodiment is not limited thereto.

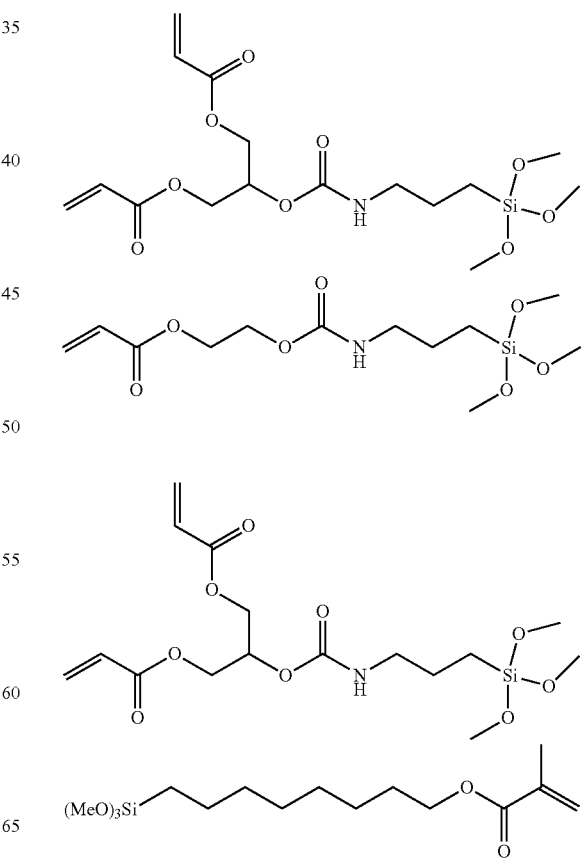

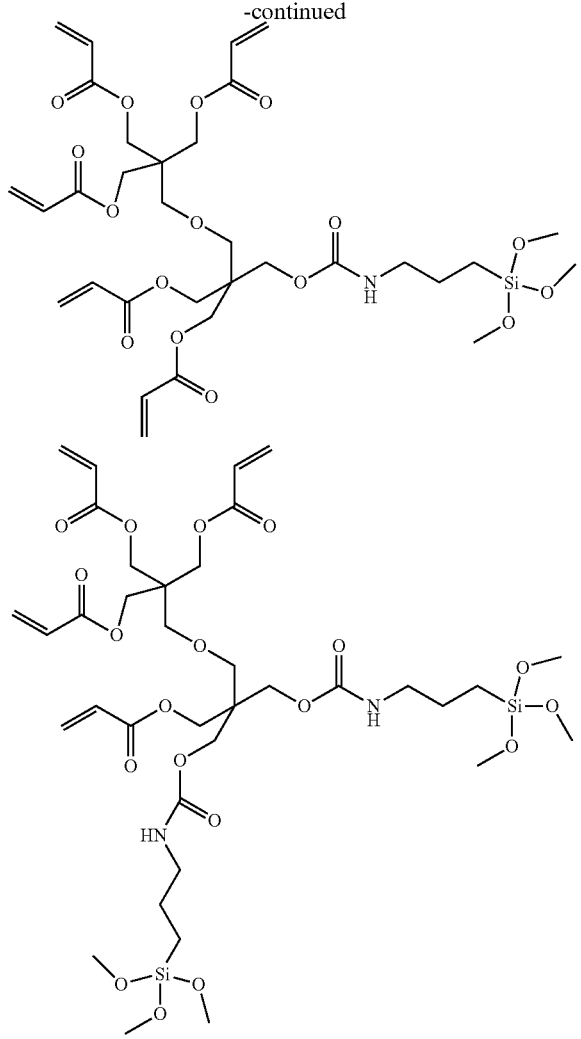

In view of strongly adhering particles and binders and securing binder strength, except for a case of an embodiment which is the second embodiment described above and docs not include (C) as a compound for forming a binder resin, a mass ratio of the content of (C) is preferably 0.1 to 0.9, more preferably 0.2 to 0.8, even more preferably 0.3 to 0.7, and particularly preferably 0.4 to 0.6 with respect to the content of (B) and the content of (C).

(Substrate)

The substrate in the antireflection film according to the present embodiment is not particularly limited, as long as the substrate is a substrate having translucency that is generally used as a substrate of an antireflection film. However, the substrate is preferably a plastic substrate or a glass substrate.

As the plastic substrate, various materials can be used. Examples thereof include substrates containing a cellulose-based resin such as cellulose acylate (triacetate cellulose, diacetyl cellulose, and acetatebutyrate cellulose); a polyester resin such as polyethylene terephthalate; a (meth)acrylic resin a polyurethane-based resin, polycarbonate, polystyrene, and an olefin-based resin. A substrate containing cellulose acylate, polyethylene terephthalate, or (meth) acrylic resin is preferable, and a substrate containing cellulose acylate is more preferable. As cellulose acylate, substrates disclosed in JP2012-093723A can be preferably used.

The thickness of the plastic substrate is generally about 10 μm to 1,000 μm. However, since favorable handling properties, high translucency, and sufficient strength can be obtained, the thickness thereof is preferably 20 μm to 200 μm and more preferably 25 μm to 100 μm. As the translucency of the plastic substrate, the transmittance of visible light is preferably 90% or greater.

(Other Function Layer)

The antireflection film according to the present embodiment may have a function layer other than an antireflection layer.

An embodiment in which a hardcoat layer is provided between a substrate and an antireflection layer is preferable. The antireflection film may comprise an easily adhesive layer for providing adhesiveness or a layer for providing antistatic properties may comprise a plurality of these layers.

[Method for Producing Antireflection Film]

The method for producing the antireflection film according to the present embodiment is not particularly limited. However, in view of production efficiency, a production method using a coating method is preferable.

That is, a method for producing an antireflection film is a method for producing an antireflection film that has a substrate and an antireflection layer, comprising:

a step of coating the substrate with a composition for forming an antireflection layer containing (A), (B), and (C) below and hardening (B) and (C) below, in which the antireflection layer has a moth eye structure having an irregular shape formed with metal oxide particles (A) below on a surface on a side opposite to an interface on the substrate side, and in the irregular shape of the antireflection layer, B/A which is a ratio between a distance A between peaks of adjacent convex portions and a distance B between a center between peaks of the adjacent convex portions and a concave portion is 0.5 or greater.

(A) Metal oxide particles having hydroxyl groups on surfaces thereof and having an average primary particle diameter of 50 nm to 380 nm.

(B) A compound having three or more (meth)acryloyl groups in one molecule, and having a weight-average molecular weight of 1,000 or less. Here, in a case where the compound (B) has a polymerizable group other than a (meth)acryloyl group, the polymerizable group is a polymerizable group that is constituted from only atoms selected from hydrogen atoms, carbon atoms, nitrogen atoms, and oxygen atoms.

(C) A compound having a (meth)acryloyl group, having a silicon atom to which at least one of a hydroxyl group and a hydrolyzable group is directly bonded, and having a weight-average molecular weight of 300 to 1,000.

The composition for forming the antireflection layer may include a solvent, a polymerization initiator, a metal complex compound, a dispersing agent of particles, a leveling agent, and an antifouling agent.

As the solvent, a solvent having close polarity as the fine particles is preferably selected, in view of improvement of the dispersibility. Specifically, for example, in a case where the fine particles are metal oxide particles, an alcohol-based solvent is preferable, and examples thereof include methanol, ethanol, 2-propanol, 1-propanol, and butanol. For example, in a case where the fine particles are metal resin particles which are subjected to hydrophobization surface modification, ketone-based, ester-based, carbonate-based, alkane, or aromatic solvents are preferable. Examples thereof include methyl ethyl ketone (MEK), dimethyl carbonate, methyl acetate, acetone, methylene chloride, and cyclohexanone. Plural types of these solvents may be used in a mixture in a range in which dispersibility are not greatly deteriorated.

It is easy to uniformly dispose the dispersing agent of the particles by decreasing cohesive force between particles. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and, since it is free to select an adsorbing group and a stereoscopic repulsion group respectively, a high polymer compound is more preferable. As the dispersing agent, commercially available products may be used. Examples thereof include DISPERBYK 160, DISPERBYK 161, DISPERBYK 162, DISPERBYK 163, DISPERBYK 164, DISPERBYK 166, DISPERBYK 167, DISPERBYK 171, DISPERBYK 180, DISPERBYK 182, DISPERBYK 2000, DISPERBYK 2001, DISPERBYK 2164, Bykumen, BYK-P104, BYK-P104S, BYK-220S, Anti-Terra203, Anti-Terra204, and Anti-Terra205 (all product names) manufactured by BYK-Chemie Japan K. K.

The leveling agent decreases the surface tension of the coating liquid so as to stabilize the liquid after application and to easily cause the particles or the binder resin to be uniformly arranged. For example, compounds disclosed in JP2004-331812A and JP2004-163610A can be used.

The antifouling agent provides water repellent and oil repellent properties to the moth eye structure so as to prevent the attachment of dirt or a fingerprint. For example, compounds disclosed in JP2012-88699A can be used.

The metal complex compound promotes hydrolyzation of the compound (C) by being added such that reactivity can be increased. As long as the metal complex compound includes a metal atom and a ligand that is coordinated with this metal atom, the metal complex compound is not particularly limited and can be appropriately selected according to the purpose. Examples thereof include di-n-propoxy•bis(acetylaeetonate)zirconium, di-iso-propoxy•bis(acetylacetonate)zirconium, di-n-butoxy•bis(acetylacetonate)zirconium, di-tert-butoxy•bis(acetylacetonate)zirconium, mono-n-propoxy•tris(acetylacetonate)zirconium, mono-iso-propoxy•tris(acetylacetonate)zirconium, mono-n-butoxy•tris(acetylacetonate)zirconium, mono-tert-butoxy•tris(acetylacetonate)zirconium, zirconiumtetraacetylacetonate, di-n-propoxy•bis(ethylacetoacetate)zirconium, di-iso-propoxy•bis(ethylacetoacetate)zirconium, di-n-butoxy•bis(ethylacetoacetate)zirconium, di-tert-butoxy•bis(ethylacetoacetate)zirconium, mono-n-propoxy•tris(ethylacetoacetate)zirconium, mono-iso-propoxy•tris(ethylacetoacetate)zirconium, mono-n-butoxy•tris(ethylacetoacetate)zirconium, mono-tert-butoxy•tris(ethylacetoacetate)zirconium, zirconiumtetraethylacetoacetate, mono(acetylacetonate)tris(ethylacetoacetate)zirconium, bis(acetylacetonate)bis(ethylacetoacetate)zirconium, tris(acetylacetonate)mono(ethylacetoacetate)zirconium, di-n-propoxy•mono(acetylacetonate)aluminum, di-iso-propoxy•mono(acetylacetonate)aluminum, di-n-butoxy•mono(acetylacetonate)aluminum, di-tert-butoxy•mono(acetylacetonate)aluminum, mono-n-propoxy•bis(acetylacetonate)aluminum, mono-iso-propoxy•bis(acetylacetonate)aluminum, mono-n-butoxy•bis(acetylacetonate)aluminum, mono-tert-butoxy•bis(acetylacetonate)aluminum, aluminumtrisacetylacetonate, di-n-propoxy•mono(ethylacetoacetate)aluminum, di-iso-propoxy•mono(ethylacetoacetate)aluminum, di-n-butoxy•mono(ethylacetoacetate)aluminum, di-tert-butoxy•mono(ethylacetoacetate)aluminum, mono-n-propoxy•bis(ethylacetoacetate)aluminum, mono-iso-propoxy•bis(ethylacetoacetate)aluminum, mono-n-butoxy•bis(ethylacetoacetate)aluminum, mono-tert-butoxy•bis(ethylacetoacelate)aluminum, aluminumtrisethylacetoacetate, mono(acetylacetonate)bis(ethylacetoacetate)aluminum, and bis(acetylacetonate)mono(ethylacetoacetate)aluminum. These may be used singly or two or more types thereof may be used in combination.

(Polymerization Initiator)

The composition for forming the antireflection layer preferably includes a polymerization initiator and more preferably includes a photopolymerizatton initiator.

Examples of the photopolymerization initiator include acetophenones, benzoins, benzophenones, phosphineoxides, ketals, anthraquinones, thioxanthones, azo compound, peroxides, 2,3-dialkyldione compounds, disulfide compounds, fluoroamine compounds, aromatic sulfoniums, lophine dimers, onium salts, borate salts, active esters, active halogens, inorganic complex, and coumarins. Specific examples, preferable embodiments, and commercially available products of the photopolymerization initiator are disclosed in paragraphs [0133] to [0151] of JP2009-098658A, and can be suitably used in the present embodiment in the same manner.

Various examples are disclosed also in page 159, [Recent UV Curing Technology]{Gijutsu Joho Kyokai KK} (1991) and pages 65 to 148 "Ultraviolet light Curing System" written by Kiyomi KATO (General Technology Center Publication: 1989), and thus are useful in the present embodiment.

The method for applying the composition for forming the antireflection layer is not particularly limited, and well-known methods can be used. Examples thereof include a dip coating method, an air knife coating method, a curtain coating method, a roller coating method, a wire bar coating method, a gravure coating method, and a the coating method.

In order to easily cause the composition to be uniformly applied, the solid content concentration of the composition for forming the antireflection layer is preferably 10 mass % to 80 mass % and more preferably 20 mass % to 60 mass %.

[Polarizing Plate]

The polarizing plate according to the present embodiment is a polarizer and a polarizing plate having the at least one protective film that protects a polarizer, and at least one protective film is an antireflection film according to the invention.

The polarizer includes an iodine-based polarizing film, a dye-based polarizing film using a dichroic dye or a polyene-based polarizing film. The iodine-based polarizing film and the dye-based polarizing film can be produced generally by using a polyvinylalcohol-based film.

[Cover Glass]

The cover glass according to the present embodiment has the antireflection film of the present embodiment as a protective film. The substrate of the antireflection film may be a glass substrate or may be a substrate obtained by bonding an antireflection film having a plastic film substrate on a glass support.

[Image Display Device]

The image display device according to the present embodiment may have the antireflection film or the polarizing plate according to the present embodiment.

The antireflection film and the polarizing plate according to the present embodiment can be appropriately used in an image display device such as a liquid crystal display device (LCD), a plasma display panel (PDP), an electroluminescent display (ELD), or a cathode ray tube display device (CRT). Particularly, a liquid crystal display device is preferable.

In general, a liquid crystal display device has a liquid crystal cell and two polarizing plates arranged on both sides of the liquid crystal cell, and the liquid crystal cell carries liquid crystal in a portion between two electrode substrates. One optically anisotropic layer is arranged between the liquid crystal cell and one polarizing plate, or two optically anisotropic layers are arranged between the liquid crystal cell and both polarizing plates. The liquid crystal cell is preferably in a TN mode, a VA mode, an OCB mode, an IPS mode, or an ECB mode.

Second Embodiment of the Invention

[Antireflection Film]

The antireflection film according to the second embodiment of the invention is an antireflection film having a substrate; and an antireflection layer containing a binder resin and metal oxide particles having an average primary particle diameter of 50 nm to 250 nm, in which, in a surface of the metal oxide particles, an amount of a hydroxyl group is $1.00 \times 10^{-1}$ or less, indentation hardness of the metal oxide particles is 400 MPa or greater, the binder resin is a resin having a hydroxyl group, and the antireflection layer has a moth eye structure having an irregular shape formed with the metal oxide particles on a surface on a side opposite to an interface on the substrate side.

Hereinafter, the antireflection film of the present embodiment is described in detail.

An example of the preferable embodiment of the antireflection film of the present embodiment is illustrated in FIG. 1.

The antireflection film 10 of FIG. 1 has the substrate 1 and the antireflection layer 2. The antireflection layer 2 has a moth eye structure having an irregular shape formed with the metal oxide particles 3 on the surface on a side opposite to the substrate 1.

The antireflection layer 2 includes the metal oxide particles 3 and the binder resin 4.

(Moth Eye Structure)

The surface on the side opposite to the substrate of the antireflection layer has a moth eye structure having an irregular shape formed with the metal oxide particles.

Here, the moth eye structure is a surface processed with a substance (material) for suppressing reflection of the light and refers to a structure having a periodic fine structure pattern. Particularly, in a case where the purpose is to suppress reflection of visible light, the moth eye structure refers to a structure having a fine structure pattern in a cycle of less than 780 nm. It is preferable that a cycle of a fine structure pattern is less than 380 nm, since the tint of the reflection light disappears. It is preferable that the cycle is 100 nm or greater, since light having a wavelength of 380 nm causes the fine structure pattern to be recognized, and antireflection properties are excellent. Whether there is a moth eye structure can be checked by observing a surface shape by a scanning-type electron microscope (SEM), an atomic force microscope (AFM), and the like and examining whether the fine structure pattern is formed.

In the irregular shape of the antireflection layer of the antireflection film according to the present embodiment, B/A which is a ratio between a distance A between peaks of adjacent convex portions and a distance B between a center between peaks of the adjacent convex portions and a concave portion is preferably 0.5 or greater. If B/A is 0.5 or greater, a depth of the concave portion with respect to the distance between convex portions becomes great, it is possible to make a refractive index inclined layer in which a refractive index is steadily changed from the air to the inside of the antireflection layer, and thus it is possible to further reduce the.

B/A can be controlled by a volume ratio of the binder resin and the metal oxide particles in the antireflection layer after hardening. Therefore, it is important to appropriately design a formulation ratio of the binder resin and the metal oxide particles. In a process of producing a moth eye structure, the binder resin may permeate or volatilize to the substrate, such that a volume ratio of the binder resin and the metal oxide particles in the antireflection layer becomes different from the formulation ratio in the composition for forming the antireflection layer in some cases. Therefore, it is important to appropriately set matching with the substrate.

It is preferable that the metal oxide particles for forming convex portions are evenly spread in a high filling rate, in order to reduce the reflectivity by causing B/A to be 0.5 or greater. It is important that the filling rate is not too high, since if a filling rate is too high, adjacent particles come into contact with each other, so as to make B/A of the irregular structure be small. In this point of view, it is preferable that the content of the metal oxide particles for forming convex portions is adjusted so that the entire antireflection layer becomes even. The filling rate can be measured with area occupancy of particles positioned on the most superficial side when the metal oxide particles for forming the convex portions are observed from the surface by a SEM or the like, and thus the filling rate is preferably 30% to 95%, more preferably 40% to 90%, and even more preferably 50% to 85%.

If particles having a small amount of the hydroxyl groups of the surface such as baked silica particles are used as the metal oxide particles, in a case where a resin not having a hydroxyl group is used as the binder resin of the antireflection layer, dispersibility of the particles in the binder resin decreases, particles in the binder resin are agglomerated with each other, and reflectivity increases. It is assumed that this phenomenon is caused by adjacent particles that come into contact with each other, so as to decrease B/A. At this point, B/A can be increased by using a resin having a hydroxyl group according to the present embodiment as the binder resin.

Hereinafter, the measuring method of B/A which is a ratio of the distance A between peaks of adjacent convex portions and the distance B between a center of the peaks of adjacent convex portions and the concave portion is described in detail.

B/A can be measured by sectional SEM observation of the antireflection film. A cross section is formed by cutting a specimen of the antireflection film with a microtome and observed with a SEM in appropriate magnification (about 5,000 times). For easier observation, an appropriate process such as carbon vapor deposition or etching may be performed in the specimen. When lengths are calculated at 100 points in which a distance between peaks of adjacent convex portions is set to be A in the interface formed by the air and the specimen, a distance between a straight line connecting peaks of adjacent convex portions and a concave portion which is a point at which the perpendicular bisector thereof reaches the particles or the binder resin in the plane which is perpendicular to the substrate surface including peaks of adjacent convex portions is set to be B, B/A is calculated with an average value of B/A.

In the SEM picture, with respect to all the captured unevenness portions, the lengths of the distance A between peaks of adjacent convex portions and the distance B between centers of peaks of adjacent convex portions and concave portion may not be correctly measured. However, in this case, the lengths are calculated by paying attention to the convex portions and the concave portions which are shown on the front side of the SEM image.

It is required that the lengths of the concave portions are measured in the same depth as the particles for forming two adjacent convex portions of which the length are measured in the SEM image. If the lengths of the concave portions are measured by setting the distance to the particles shown in the more front side to be B, it may be assumed that B is small.

B/A preferably 0.5 or greater, more preferably 0.6 or greater, and even more preferably 0.7 or greater. Since a moth eye structure can be strongly fixed, and thus abrasion resistance is excellent, B/A is preferably 0.9 or less.

It is preferable that the metal oxide particles are evenly spread in a high filling rate, in order to reduce the reflectivity. It is important that the filling rate is not too high, since if a filling rate is too high, adjacent particles come into contact with each other, so as to make B/A of the irregular shape be small. Therefore, the reflectivity increases.

In this point of view, it is preferable that the content of the metal oxide particles is adjusted so that the entire antireflection layer becomes even. The filling rate can be measured with area occupancy of particles positioned on the most superficial side when the metal oxide particles are observed from the surface by a SEM or the like. The filling rate is preferably 30% to 95%, more preferably 40% to 90%, and even more preferably 50% to 85%.

(Metal Oxide Particles)

Metal oxide particles for forming a moth eye structure of the antireflection layer are described.

The metal oxide particles have an average primary particle diameter of 50 nm to 250 nm, the amount of the hydroxyl groups of the surface of $1.00 \times 10^{-1}$ or less, and indentation hardness of 400 MPa or greater.

As the metal oxide particles, metal oxide particles of which an average primary particle diameter is 50 nm to 250 nm and also a degree of dispersion (Cv value of the average primary particle diameter is 10% or less can be suitably used. The degree of dispersion (Cv value) is a value (unit: %) that can be calculated by "Cv value=([Standard deviation of average primary particle diameter]/[average primary particle diameter])×100(1)". A smaller degree of dispersion means an average primary particle diameter is unified. The average primary particle diameter is measured by using a scanning-type electron microscope (SEM). The average particle diameter of the metal oxide particles and the standard deviation thereof are calculated based on measured values of particle diameters of 200 or greater metal oxide particles. In a case where particles are not a spherical shape, the average particle diameter described herein refers to the maximum diameter of a circumscribed circle. Also in a case of a mixture of plural types of particles having different average primary particle diameters, a Cv value as the entire particles is calculated.

If the average primary particle diameter is 50 nm or greater, the metal oxide particles can function as an antireflection layer having a moth eye structure. If the average primary particle diameter is 250 nm or less, Bragg diffraction caused by regularly arranged metal oxide particles hardly occurs, and thus a color development (coloration) phenomenon derived from this does not appear. Accordingly, it is preferable that a Cv value is smaller, since particle agglomeration hardly occurs, an antireflection layer in a moth eye structure with low reflectivity and high transmittance can be formed while coloration is small. An average primary particle diameter is preferably 100 nm to 220 nm and more preferably 120 nm to 200 nm. A Cv value is preferably 1% to 10% and more preferably 1% to 5%.

Since the Cv value can be caused to be small, it is preferable to only contain metal oxide particles having the primary particle diameter of 50 nm to 250 nm, it is more preferable to only contain metal oxide particles having the primary particle diameter of 100 nm to 220 nm, and it is even more preferable to only contain metal oxide particles having the primary particle diameter of 120 nm to 200 nm, as the metal oxide particles.

As another embodiment, it is preferable that the metal oxide particles include both of metal oxide particles having an average primary particle diameter of 120 nm to 250 nm and metal oxide particles having an average primary particle diameter of 50 nm or greater and less than 120 nm. In a case where particles having greater particle diameters mainly contribute to the moth eye structure, particles having smaller particle diameters are mixed between greater particles and suppress agglomeration between the greater particles, and as a result, B/A is increased, such that the reflectivity and the haze become better.

Since metal oxide particles having primary particle diameters of 50 nm or greater and less than 120 nm are more immersed in the binder, it is indicated that the convex portions as the antireflection layer are formed by metal oxide particles having primary particle diameters of 120 nm to 250 nm.

The frequency of metal oxide particles having average primary particle diameters of 50 nm or greater and less than 120 nm with respect to metal oxide particles having average primary particle diameters of 120 nm to 250 nm is preferably included in a frequency of 2 to 5 times. If the frequency is caused to be in this range, it is possible to increase the agglomeration suppression effect and reduce reflectivity. It is preferable that the metal oxide particles having the average primary particle diameters is 50 nm or greater is caused to have the average primary particle diameter of 75 nm to 110 nm, the reflectivity is caused to be particularly low.

In a case where metal oxide particles having different average primary particle diameters are used together, the amounts of the hydroxyl groups of the surfaces of the both particles are preferably caused to be close to each other, since agglomeration thereof becomes difficult.

However, the metal oxide particles having the average primary particle diameter of 50 nm or greater and less than 120 nm are mainly used so as to suppress the agglomeration of the metal oxide particles having the average primary particle diameter of 120 nm to 250 nm and separate the metal oxide particles. Therefore, metal oxide particles of which the amount of the hydroxyl groups is more than $1.00 \times 10^{-1}$ or indentation hardness is less than 400 MPa may be used.

The average primary particle diameter of the metal oxide particles refers to a 50% particle diameter of accumulation of the volume average particle diameters. In a case where the average primary particle diameters of the metal oxide particles included in the antireflection layer are measured, the average primary particle diameters can be measured by an electron micrograph. For example, the antireflection film is observed in an appropriate magnification (about 5,000 times) by SEM observation from the surface side, respective diameters of 100 primary particles are measured, and the volumes thereof are calculated, so as to cause the 50% particle diameter of the accumulation to be the average primary particle diameter. In a case where a particle is not a spherical shape, an average value of a long diameter and a short diameter is considered as a diameter of the primary particle. At this point, carbon vapor deposition, an etching treatment, or the like is appropriately performed on the sample, such that the observation can be performed easily.

According to the present embodiment an amount of the hydroxyl groups of the particle surface is defined as follows. The amount of the hydroxyl groups is measured by solid $^{29}$Si NMR ($^{29}$Si CP/MAS). The amount of the hydroxyl groups of the fine particle surface when signal strength of metal elements M on the surfaces of the metal oxide particles which are bonded to n hydroxyl groups is set to be Qn, an amount of the hydroxyl groups is set to be a sum of existing Qn×n/(square of radius of particle (unit: nm)). For example, in a case where particles are silica (having a particle radius R), silicon (signal strength: Q0) which is bonded to four atoms of neutral oxygen, silicon (signal strength: Q1) which is bonded to three atoms of neutral oxygen and one hydroxyl group, silicon (signal strength: Q2) which is bonded to two atoms of neutral oxygen and two hydroxyl groups exist the amount of the hydroxyl groups on the particle surfaces is $(Q1\times1+Q2\times2)R^2$. In a case of silica, a signal providing the signal strength Q2 has a chemical shift of −91 to −94 ppm, a signal providing the signal strength Q1 has a chemical shift of −100 to −102 ppm, a signal providing the signal strength Q0 has a chemical shift of −109 to −111 ppm.

The amount of the hydroxyl groups of the particle surface becomes smaller as the particles become harder by baking. The amount of the hydroxyl groups is preferably $1.00\times10^{-5}$ to $1.00\times10^{-1}$, more preferably $1.00\times10^{-4}$ to $5.00\times10^{-2}$, and even more preferably $5.00\times10^{-4}$ to $1.00\times10^{-3}$.

The indentation hardness of the metal oxide particles is 400 MPa or greater, preferably 450 MPa or greater, and more preferably 550 MPa or greater. It is preferable that the indentation hardness of the metal oxide particles is 400 MPa or greater, since durability of a moth eye structure with respect to pressure in a thickness direction increases. It is preferable that the indentation hardness of the metal oxide particles is 1,000 MPa or less, in order to cause metal oxide particles not to be breakable and fragile.

The indentation hardness of the metal oxide particles can be measured by a nano indenter or the like. As a specific measuring method, the sample can be measured by aligning metal oxide particles on a substrate (glass plate, quartz plate, or the like) that is harder than the metal oxide particles such that one or more steps are not overlapped and pushing the metal oxide particles with a diamond indenter. At this point, it is preferable to fix the particles with a resin or the like so as not to move. However, in a case where the particles are fixed with a resin, the pushing is performed by adjusting the particles such that a portion of the particles extrude. It is preferable to specify an indentation position by a tribo indenter.

In the present embodiment, particles are aligned on a substrate, a sample in which the particles are fixed to each other by using a small amount of curable resin so as not to influence a measurement value is created, and indentation hardness of the metal oxide particles is obtained by using a method for measuring this sample by particles.

Examples of the metal oxide particles include silica particles, titania particles, zirconia particles, and antimony pentoxide particles. However, silica particles are preferable since silica particles have refractive indexes closer to those of many binders, haze is not likely to occur, and thus a moth eye structure is easily formed.

The metal oxide particles are particularly preferably baked silica particles for the reason that the amount of the hydroxyl groups of the surface is appropriately great, and the particles are hard.

The baked silica particles can be produced by well-known techniques of obtaining silica particles by hydrolyzing and condensing a hydrolyzable silicon compound in an organic solvent including water and a catalyst and baking the silica particles. For example, it is possible to refer to JP2003-176121A and JP2008-137854A.

The silicon compound which is a raw material for producing baked silica particles is not particularly limited. Examples thereof include a chlorosilane compound such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino)propyltrimethoxysilane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyltriacetoxysilane, phenyltriacetoxysilane, dimethyldiacetoxysilane, diphenyldiacetoxysilane, and trimethylacetoxysilane; and a silanol compound such as dimethylsilanediol, diphenylsilanediol, and trimethylsilanol. Among the silane compounds exemplified above, an alkoxysilane compound is particularly preferable since an alkoxysilane compound is easily obtained, and the obtained baked silica particles do not include a halogen atom as impurities. As a preferable embodiment of the baked silica particles according to the present embodiment, it is preferable that the content of the halogen atom is substantially 0%, and a halogen atom is not detected.

The baking temperature is not particularly limited, and the baking temperature is preferably 800 to 1,300° C., and more preferably 1,000° C. to 1,200° C.

The baked silica particles are preferably baked silica particles surface-modified with a compound having a (meth) acryloyl group. If the baked silica particles surface-modified with the compound having the (meth)acryloyl group are used, effects of dispersibility improvement, film hardness improvement, agglomeration prevention, and the like in the composition for forming the antireflection layer can be expected. As specific examples of the surface treatment method and preferable examples thereof, disclosure of "0119" to "0147" of JP2007-298974A can be referred to.

The shape of particles is most preferably a spherical shape, but the shape thereof may be a shape other than the spherical shape such as an undefined shape.

As the metal oxide particles, commercially available particles may be baked to be used. As the specific examples, IPA-ST-L (average primary particle diameter: 50 nm, silica sol manufactured by Nissan Chemical Industries, Ltd.), IPA-ST-ZL (average primary particle diameter: 80 nm, silica sol manufactured by Nissan Chemical Industries, Ltd.), SNOWTEX MP-1040 (average primary particle diameter: 100 nm, silica manufactured by Nissan Chemical Industries, Ltd.), SNOWTEX MP-2040 (average primary particle diameter 200 nm, silica manufactured by Nissan Chemical Industries, Ltd.), EPOSTAR KE-P10 (average primary particle diameter: 150 nm, amorphous silica manufactured by Nippon Shokubai Co., Ltd.), EPOSTAR KE-P20 (average primary particle diameter: 200 nm, amorphous silica manufactured by Nippon Shokubai Co., Ltd.), and ASFP-20 (average primary particle diameter: 200 nm, alumina manufactured by NEC Corporation) can be preferably used. If requirements of the metal oxide particles according to the present embodiment are satisfied, commercially available particles may be used without change.

The content ratio of the metal oxide particles and the binder resin (mass of metal oxide particles/mass of binder resin) is preferably 10/90 to 95/5, more preferably 20/80 to 90/10, and even more preferably 30/70 to 85/15. It is preferable that (mass of metal oxide particles/mass of binder resin) is 10/90 or greater, since B/A of the irregular shape of the moth eye structure increases, and reflectivity decreases. It is preferable that (mass of metal oxide particles/mass of binder resin) is 95/5 or less, since adhesiveness between the metal oxide particles and the substrate increases, it is difficult for the metal oxide particles to be agglomerated during the production step, and the disorder or deterioration of the haze does not occur.

The distribution of the distances A between peaks of adjacent convex portions in the antireflection layer is preferably 200 nm or less. It is preferable that the distribution of A is 200 nm or less in view of deterioration of the haze and deterioration of reflectivity, since distribution of the distances between particles is narrow (sharp), and particles evenly exist without approaching each other or being separated from each other. The half-width of the distribution of A is more preferably 125 nm or less and even more preferably 100 nm or less.

(Binder Resin)

The binder resin of the antireflection layer is described.

The binder resin of the antireflection layer is a resin having a hydroxyl group. If the binder resin of the antireflection layer is a resin having a hydroxyl group, even if the metal oxide particles have the amount of the surface hydroxyl groups of $1.00 \times 10^{-1}$ or less, dispersibility is high, the metal oxide particles in the binder resin are not agglomerated, the haze of the antireflection layer can be decreased, and thus the reflectivity can be also decreased.

The binder resin is preferably a resin obtained by polymerizing a polymerizable compound having at least one of a group having an ethylenically unsaturated double bond and an epoxy group, and the polymerizable group is preferably a resin obtained by polymerizing a polymerizable compound only having a group having an ethylenically unsaturated double bond.

The hydroxyl group equivalent of one molecule of the polymerizable compound is preferably 1 to 10,000, more preferably 100 to 5,000, and even more preferably 200 to 3,000. The hydroxyl group equivalent according to the present embodiment is a molecular weight per one hydroxyl group and a value obtained by dividing the molecular weight of the polymerizable compound by the number of hydroxyl groups included in one molecule.

Examples of the polymerizable compound having the group having the ethylenically unsaturated double bond include compounds having a (meth)acryloyl group, a vinyl group, a styryl group, or an allyl group. Among these, a compound having a (meth)acryloyl group and —C(O)OCH=CH$_2$ is preferable, and a compound having a (meth)acryloyl group is more preferable.

Specific examples of the polymerizable compound include (meth)acrylic acid diesters of alkylene glycol, (meth)acrylic acid diesters of polyoxyalkylene glycol, (meth)acrylic acid diesters of alcohol, (meth)acrylic acid diesters of adducts of ethylene oxide or propylene oxide, epoxy (meth)acrylates, urethane (meth)acrylates, and polyester (meth)acrylates.

Among these, esters of alcohol and (meth)acrylic acid are preferable (for example, 2-hydroxyethyl methacrylate), and esters of (polyhydric) alcohol and (meth)acrylic acid are particularly preferable. Examples thereof include 2-hydroxyethyl(2-hydroxyethyl methacrylate) acrylate (hydroxyl group equivalent: 116), pentaerythritol triacrylate (hydroxyl group equivalent:538), dipentaerythritol tetraacrylate (hydroxyl group equivalent: 228), dipentaerythritol pentaacrylate (hydroxyl group equivalent: 524), 2-hydroxyethyl(2-hydroxyethyl methacrylate) methacrylate (hydroxyl group equivalent: 130), pentaerythritol trimethacrylate (hydroxyl group equivalent: 340), dipentaerythritol tetramethacrylate (hydroxyl group equivalent: 256), and dipentaerythritol pentamethacrylate (hydroxyl group equivalent:594).

As the polymerizable compound, a commercially available compound can be used. Specific examples thereof include NKester 701A (manufactured by Shin-nakamura Chemical Co., Ltd.) (hydroxyl group equivalent: 200), NKester ACB-21 (manufactured by Shin-nakamura Chemical Co., Ltd.) (hydroxyl group equivalent: 292), KAYARAD PET30 (manufactured by Nippon Kayaku Co., Ltd.) (hydroxyl group equivalent: 533), NKester A-TMM3 (manufactured by Shin-nakamura Chemical Co., Ltd.) (hydroxyl group equivalent: 897). KAYARAD DPHA (manufactured by Nippon Kayaku Co., Ltd.) (hydroxyl group equivalent: 1,102), ARONIX M-402 (manufactured by Toagosei Co., Ltd.) (hydroxyl group equivalent: 1,597), ARONIX M-405 (manufactured by Toagosei Co., Ltd.) (hydroxyl group equivalent: 3,799), and ARONIX M-450 (manufactured by Toagosei Co., Ltd.) (hydroxyl group equivalent: 6,986).

Plural compounds may be mixed to be used as the polymerizable compound. At this point, the molecular weight by the formulation ratio of the polymerizable compound is set to be an averaged molecular weight, and the hydroxyl group equivalent is also set to be the average number of hydroxyl groups per one molecule.

(Substrate)

The substrate in the antireflection film according to the present embodiment is not particularly limited, as long as the substrate is a substrate having translucency that is generally used as a substrate of an antireflection film. However, the substrate is preferably a plastic substrate or a glass substrate.

As the plastic substrate, various materials can be used. Examples thereof include substrates containing a cellulose-based resin such as cellulose acylate (triacetate cellulose, diacetyl cellulose, and acetatebutyrate cellulose); a polyester resin such as polyethylene terephthalate; a (meth)acrylic resin, a polyurethane-based resin, polycarbonate, polystyrene, and an olefin-based resin. A substrate containing cellulose acylate, polyethylene terephthalate, or (meth) acrylic resin is preferable, and a substrate containing cellulose acylate is more preferable. As cellulose acylate, substrates disclosed in JP2012-093723A can be preferably used.

The thickness of the plastic substrate is generally about 10 µm to 1,000 µm. However, since favorable handling properties, high translucency, and sufficient strength can be obtained, the thickness thereof is preferably 20 µm to 200

µm and more preferably 25 µm to 100 µm. As the translucency of the plastic substrate, the transmittance of visible light is preferably 90% or greater.

(Other Function Layer)

The antireflection film according to the present embodiment may have a function layer other than an antireflection layer.

An embodiment in which a hardcoat layer is provided between a substrate and an antireflection layer is preferable. The antireflection film may comprise an easily adhesive layer for providing adhesiveness or a layer for providing antistatic properties may comprise a plurality of these layers.

[Method for Producing Antireflection Film]

The method for producing the antireflection film according to the present embodiment is not particularly limited. However, in view of production efficiency, a production method using a coating method is preferable.

That is, a method for producing the antireflection film is a method for producing an antireflection film that has a substrate and an antireflection layer containing a binder resin and metal oxide particles having an average primary particle diameter of 50 nm to 250 nm, comprising:

a step of coating the substrate with a composition for forming an antireflection layer containing a polymerizable compound for forming a binder resin having a polymerizable functional group and metal oxide particles having an average primary particle diameter of 50 nm to 250 nm, in which, in a surface of the metal oxide particles, an amount of a hydroxyl group is $1.00 \times 10^{-1}$ or less, indentation hardness of the metal oxide particles is 400 MPa or greater, the binder resin is a resin having a hydroxyl group, and the antireflection layer has a moth eye structure having an irregular shape formed with the metal oxide particles on a surface on a side opposite to an interface on the substrate side.

The polymerizable compound for forming the binder resin having a polymerizable functional group included in the composition for forming the antireflection layer and metal oxide particles having the average primary particle diameter of 50 nm to 250 nm are as described above.

The composition for forming the antireflection layer may include a solvent, a polymerization initiator, a dispersing agent of particles, a leveling agent, and an antifouling agent.

As the solvent, a solvent having close polarity as the fine particles is preferably selected, in view of improvement of the dispersibility. Specifically, for example, in a case where the fine particles are metal oxide particles, an alcohol-based solvent is preferable, and examples thereof include methanol, ethanol, 2-propanol, 1-propanol, and butanol. For example, in a case where the fine particles are metal resin particles or resin panicles which are subjected to hydrophobization surface modification, ketone-based, ester-based, carbonate-based, alkane, or aromatic solvents are preferable. Examples thereof include methyl ethyl ketone (MEK), dimethyl carbonate, methyl acetate, acetone, methylene chloride, and cyclohexanone. Plural types of these solvents may be used in a mixture in a range in which dispersibility are not greatly deteriorated.

It is easy to uniformly dispose the dispersing agent of the particles by decreasing cohesive force between particles. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and, since it is free to select an adsorbing group and a stereoscopic repulsion group respectively, a high polymer compound is more preferable. As the dispersing agent, commercially available products may be used. Examples thereof include DISPERBYK 160, DISPERBYK 161, DISPERBYK 162, DISPERBYK 163, DISPERBYK 164, DISPERBYK 166, DISPERBYK 167, DISPERBYK 171, DISPERBYK 180, DISPERBYK 182, DISPERBYK 2000, DISPERBYK 2001, DISPERBYK 2164, Bykumen, BYK-2009, BYK-P104, BYK-P104S, BYK-220S, Anti-Terra203, Anti-Terra204, and Anti-Terra205 (all product names) manufactured by BYK-Chemie Japan K. K.

The leveling agent decreases the surface tension of the coating liquid so as to stabilize the liquid after application and to easily cause the particles or the binder resin to be uniformly arranged. For example, compounds disclosed in JP2004-331812A and JP2004-163610A can be used.

The antifouling agent provides water repellent and oil repellent properties to the moth eye structure so as to prevent the attachment of dirt or a fingerprint. For example, compounds disclosed in JP2012-88699A can be used.

(Polymerization Initiator)

In a case where the polymerizable compound for forming the binder resin is a photopolymerizable compound, the composition for forming the antireflection layer is preferably includes a photopolymerization initiator.

Examples of the photopolymerization initiator include acetophenones, benzoins, benzophenones, phosphineoxides, ketals, anthraquinones, thioxanthones, azo compound, peroxides, 2,3-dialkyldione compounds, disulfide compounds, fluoroamine compounds, aromatic sulfoniums, lophine dimers, onium salts, borate salts, active esters, active halogens, inorganic complex, and coumarins. Specific examples, preferable embodiments, and commercially available products of the photopolymerization initiator are disclosed in paragraphs [0133] to [0151] of JP2009-098658A, and can be suitably used in the present embodiment in the same manner.

Various examples are disclosed also in page 159, [Recent UV Curing Technology] {Gijutsu Joho Kyokai KK} (1991) and pages 65 to 148 "Ultraviolet light Curing System" written by Kiyomi KATO (General Technology Center Publication: 1989), and thus are useful in the present embodiment.

The method for applying the composition for forming the antireflection layer is not particularly limited, and well-known methods can be used. Examples thereof include a dip coating method, an air knife coating method, a curtain coating method, a roller coating method, a wire bar coating method, a gravure coating method, and a die coating method.

In order to easily cause the composition to be uniformly applied, the solid content concentration of the composition for forming the antireflection layer is preferably 10 mass % to 80 mass % and more preferably 20 mass % to 60 mass %.

(Other Additives)

The antireflection layer may contain fine particles different from the metal oxide particles. In this case, metal oxide particles are required to be small in order to not to deteriorate the shape of the moth eye structure. It is preferable that the different fine particles are particles having an average primary particle diameter of 50 nm or greater and less than 120 nm, since the agglomeration between the metal oxide particles is suppressed, and reflectivity and haze are reduced in some cases. Specific examples of the different fine particles include ORGANOSILICASOL IPA-ST, IPA-ST-L, IPA-ST-ZL, MEK-ST, MEK-ST-L, MEK-ST-ZL, MEK-AC-4130Y, MEK-AC-5140Z, THRULYA 2320, 4320, and 5320, (above are unbaked silica particle dispersion liquid manufactured by Nissan Chemical Industries, Ltd.), EPOSTAR KE-P10 (unbaked silica particles manufactured by Nippon Shokubai Co., Ltd.), and XX-242S (cross-linked polymethyl methacrylate particles manufactured by Sekisui Plastics Co., Ltd.).

[Polarizing Plate]

The polarizing plate according to the present embodiment is a polarizer and a polarizing plate basing the at least one protective film that protects a polarizer, and at least one protective film is an antireflection film according to the invention.

The polarizer includes an iodine-based polarizing film, a dye-based polarizing film using a dichroic dye or a polyene-based polarizing film. The iodine-based polarizing film and the dye-based polarizing film can be produced generally by using a polyvinylalcohol-based film.

[Cover Glass]

The cover glass according to the present embodiment has the antireflection film of the present embodiment as a protective film. The substrate of the antireflection film may be a glass substrate or may be a substrate obtained by bonding an antireflection film having a plastic film substrate on a glass support.

[Image Display Device]

The image display device according to the present embodiment may have the antireflection film or the polarizing plate according to the present embodiment.

The antireflection film and the polarizing plate according to the present embodiment can be appropriately used in an image display device such as a liquid crystal display device (LCD), a plasma display panel (PDP), an electroluminescent display (ELD), or a cathode ray tube display device (CRT). Particularly, a liquid crystal display device is preferable.

In general, a liquid crystal display device has a liquid crystal cell and two polarizing plates arranged on both sides of the liquid crystal cell, and the liquid crystal cell carries liquid crystal in a portion between two electrode substrates. One optically anisotropic layer is arranged between the liquid crystal cell and one polarizing plate, or two optically anisotropic layers are arranged between the liquid crystal cell and both polarizing plates. The liquid crystal cell is preferably in a TN mode, a VA mode, an OCB mode, an IPS mode, or an ECB mode.

EXAMPLES

The invention is described in detail with reference to the examples below. Amounts of materials, reagents, and substances indicated in the examples below, ratios thereof, and operations can be appropriately changed without departing from the gist of the invention. Therefore, the scope of the invention is not limited to the specific examples below.

Example and Comparative Example According to the First Embodiment of the Invention (Production of Substrate with Hardcoat Layer)

A cellulose triacetate film (TDH60UF, manufactured by Fujifilm Corporation) was coated with a coating liquid for forming a hardcoat layer in a composition described below, and the coating liquid was hardened by being irradiated with ultraviolet ray in the irradiation amount of 60 mJ/cm² by an air-cooling metal halide lamp during nitrogen purge, so as to form a hardcoat layer in a film thickness of 8 µm. In this manner, a substrate with a hardcoat layer was produced.

Composition of Coating Liquid for Forming Hardcoat Layer

| | |
|---|---|
| A-TMMT | 44.6 parts by mass |
| IRGACURE 127 | 1.9 parts by mass |
| Methyl ethyl ketone | 10.7 parts by mass |
| Methyl isobutyl ketone | 37.5 parts by mass |
| Methyl acetate | 5.4 parts by mass |

(Preparation of Coating Liquid for Forming Antireflection Layer)

Respective components were input to the mixing tank such that the compositions of Table 1 below were satisfied, stirring was performed for 60 minutes, ultrasonic dispersion was performed for 30 minutes with an ultrasonic disperses and filtration was performed with a filter made of polypropylene having a hole diameter of 5 µm, so as to obtain a coating liquid for forming an antireflection layer.

As (A), (B), and (C) of Table 1 below, raw materials described in Table 2 below were used, and thus the compositions for forming the antireflection layers of respective examples and respective comparative examples were prepared.

TABLE 1

| | Formulation amount |
|---|---|
| (A) | 72.5 |
| (B) | 32.4 |
| (C) | |
| Antifouling agent (Example 1 of WO2009/133770) | 1.7 |
| IRGACURE 127 | 1.4 |
| Aluminum (III) acetyl acetate | 0.7 |
| Ethanol | 713.0 |
| Methyl ethyl ketone | 178.3 |

The unit of formulation amounts of the respective components indicate "parts by mass" in Table 1.

As the compound for forming the binder resin, (B) and (C) were used by 32.4 parts by mass in total.

(Producing for Antireflection Film)

Hardcoat layers of substrates with hardcoat layers were coated with compositions for forming respective antireflection layer using raw materials shown in Table 2 below, as (A), (B), and (C) by using a gravure coater in a wet application amount of about 2.8 ml/m², drying was performed at 120° C. for five minutes, and thereafter hardening was performed by irradiation with ultraviolet light in an irradiation amount of 600 mJ/cm² using an air-cooling metal halide lamp, while nitrogen purge was performed to have an atmosphere in which an oxygen concentration was 0.1 volume % or less, so as to produce antireflection films of Examples 1 to 34 and Comparative Examples 1 and 5.

Antireflection films of Examples 35 to 51 were produced in the same manner as in Example 1 except for using FUJITAC TG60UL (manufactured by Fujifilm Corporation) instead of the cellulose triacetate film (TDH60UF, manufactured by Fujifilm Corporation) and using compositions for forming antireflection layers of Table 3 below.

(Evaluation of Antireflection Film)

The entire characteristics of the antireflection films were evaluated by a method below. Results are shown in Table 2.

(Integral Reflectivity)

After a back surface of the antireflection film (on the cellulose triacetate film side) was roughened with sandpaper and was treated with black ink, an adapter ARV-474 was mounted to a spectrophotometer V-550 (manufactured by JASCO Corporation) in a state in which reflection on the back surface was removed, integral reflectivity was measured in the wavelength range of 380 nm to 780 nm at an incidence angle of 5°, and an average reflectivity was calculated, so as to evaluate antireflection properties.

(Pencil Hardness Test and Eraser Rubbing Test after Pencil Hardness Test)

Pencil hardness tests (H/2H/3H) were performed on surfaces of antireflection layers and thereafter pencils were removed with an eraser.

The pencil hardness test was performed by a pencil hardness evaluation method regulated by JIS-K5400 by using a pencil for a test regulated in J1S-S6006 after the antireflection film was damped at 25° C., in a condition of relative humidity of 60%, for two hours.

The eraser rubbing test on a pencil hardness test portion was performed by using a rubbing tester.

Evaluation environment condition: 25° C., 60% RH
Rubbing material: A plastic eraser {"MONO" manufactured by Tombow Pencil Co., Ltd.} was fixed to a rubbing tip portion of a tester that is brought into contact with a sample (1 cm×1 cm).
Rubbing speed: 2 cm/seconds
Load: 250 g/cm$^2$
Tip portion contact area: 1 cm×1 cm
Number of times of rubbing: 50 times of reciprocation From SEM pictures of portions on which pencil hardness tests were not performed and were performed, the number of particles were counted so as to calculate a remnant ratio of the particles.

Remnant ratio of particles:=(Number of particles per unit area of portion on which pencil hardness test was performed/number of particles per unit area of portion on which pencil hardness test was not performed)*100

A: Particle remnant ratio of 80% or greater
B: Particle remnant ratio of 60% or greater and less than 80%
C: Particle remnant ratio of less than 60%
(B/A)

An antireflection film sample was cut by a microtome to form a cross section, a carbon vapor deposition was performed on the cross section, and etching was performed for ten minutes. 20 fields of view were observed by using a scanning-type electron microscope (SEM) by 5,000 times, and images were captured. In interfaces made by the air and the samples, the distances A between peaks of adjacent convex portions, the distances B between centers between peaks of adjacent convex portions and concave portions were measured at 100 points with captured images, and an average values of B/A were calculated.

TABLE 2

| | (A) Metal oxide particles | Surface treatment coupling agent of particles (A) | Compound for forming binder resin | | | B/A | Reflec- tivity | Particle remnant | | |
|---|---|---|---|---|---|---|---|---|---|---|
| | | | (B) | (C) | (C)/((B) + (C)) | | | H | 2H | 3H |
| Example 1 | A2 | None | KAYARAD DPHA | C5 | 0.1 | 0.6 | 1.3% | A | C | C |
| Example 2 | A2 | None | KAYARAD DPHA | C5 | 0.2 | 0.7 | 1.1% | A | B | C |
| Example 3 | A2 | None | KAYARAD DPHA | C5 | 0.6 | 0.7 | 1.1% | A | B | C |
| Example 4 | A2 | None | KAYARAD DPHA | C5 | 0.8 | 0.7 | 1.3% | A | B | C |
| Example 5 | A2 | None | KAYARAD DPHA | C5 | 0.9 | 0.7 | 1.3% | A | C | C |
| Example 6 | A3-C6 | KBM-5103 | KAYARAD DPHA | C5 | 0.1 | 0.6 | 1.2% | A | B | C |
| Example 7 | A3-C6 | KBM-5103 | KAYARAD DPHA | C5 | 0.2 | 0.7 | 1.3% | A | B | B |
| Example 8 | A3-C6 | KBM-5103 | KAYARAD DPHA | C5 | 0.6 | 0.8 | 0.9% | A | B | B |
| Example 9 | A3-C6 | KBM-5103 | KAYARAD DPHA | C5 | 0.8 | 0.7 | 1.3% | A | B | B |
| Example 10 | A3-C6 | KBM-5103 | KAYARAD DPHA | C5 | 0.9 | 0.7 | 1.3% | A | B | C |
| Example 11 | A2 | None | KAYARAD DPHA | C4 | 0.6 | 0.6 | 1.9% | A | A | C |
| Example 12 | A2 | None | KAYARAD DPHA | C3 | 0.6 | 0.7 | 1.3% | A | A | B |
| Example 13 | A2 | None | KAYARAD DPHA | C2 | 0.6 | 0.7 | 1.3% | A | A | A |
| Example 14 | A2 | None | KAYARAD DPHA | C1 | 0.6 | 0.7 | 1.3% | A | A | A |
| Example 15 | A3-C6 | KBM-5103 | KAYARAD DPHA | C4 | 0.6 | 0.7 | 1.3% | A | A | B |
| Example 16 | A3-C6 | KBM-5103 | KAYARAD DPHA | C3 | 0.6 | 0.7 | 1.3% | A | A | A |
| Example 17 | A3-C6 | KBM-5103 | KAYARAD DPHA | C2 | 0.6 | 0.7 | 1.3% | A | A | A |
| Example 18 | A3-C6 | KBM-5103 | KAYARAD DPHA | C1 | 0.6 | 0.7 | 1.3% | A | A | A |
| Example 19 | A3-C5 | C5 | KAYARAD DPHA | — | — | 0.8 | 1.1% | A | A | C |
| Example 20 | A3-C4 | C4 | KAYARAD DPHA | — | — | 0.8 | 1.2% | A | A | A |
| Example 21 | A3-C3 | C3 | KAYARAD DPHA | — | — | 0.8 | 1.4% | A | A | A |
| Example 22 | A3-C2 | C2 | KAYARAD DPHA | — | — | 0.8 | 1.7% | A | A | A |
| Example 23 | A3-C1 | C1 | KAYARAD DPHA | — | — | 0.8 | 0.8% | A | A | A |
| Example 24 | A3-C5 | C5 | KAYARAD DPHA | C5 | 0.6 | 0.7 | 1.5% | A | A | C |
| Example 25 | A3-C4 | C4 | KAYARAD DPHA | C4 | 0.6 | 0.7 | 1.5% | A | A | A |
| Example 26 | A3-C3 | C3 | KAYARAD DPHA | C3 | 0.6 | 0.7 | 1.5% | A | A | A |
| Example 27 | A3-C2 | C2 | KAYARAD DPHA | C2 | 0.6 | 0.7 | 1.5% | A | A | A |
| Example 28 | A3-C1 | C1 | KAYARAD DPHA | C1 | 0.6 | 0.7 | 1.5% | A | A | A |
| Example 29 | A3-C6 | KBM-5103 | A-DPH | C3 | 0.6 | 0.7 | 1.3% | A | B | B |
| Example 30 | A3-C6 | KBM-5103 | KAYARAD PET-30 | C3 | 0.6 | 0.7 | 1.3% | A | B | B |
| Example 31 | A3-C5 | KBM-5103 | A-TMMT | C3 | 0.6 | 0.7 | 1.3% | A | B | B |
| Example 32 | A1 | None | KAYARAD DPHA | C3 | 0.6 | 0.8 | 1.1% | A | (*1) | (*1) |
| Example 33 | KE-S10 | None | KAYARAD DPHA | C3 | 0.6 | 0.6 | 1.3% | A | A | A |
| Example 34 | KE-S30 | None | KAYARAD DPHA | C3 | 0.6 | 0.8 | 1.2% | A | A | A |
| Comparative Example 1 | A3-C6 | KBM-5103 | KAYARAD DPHA | C6 | 0.6 | 0.7 | 1.5% | B | C | C |
| Comparative Example 2 | A3-C6 | KBM-5103 | KAYARAD DPHA | C7 | 0.6 | 0.2 | 2.5% | A | A | A |
| Comparative Example 3 | A3-C6 | KBM-5103 | KAYARAD DPHA | C8 | 0.6 | 0.7 | 1.5% | C | C | C |
| Comparative Example 4 | A3-C6 | KBM-5103 | KAYARAD DPHA | C9 | 0.6 | 0.7 | 1.5% | C | C | C |

TABLE 2-continued

| | (A) Metal oxide particles | Surface treatment coupling agent of particles (A) | Compound for forming binder resin (B) | (C) | (C)/((B) + (C)) | B/A | Reflec- tivity | Particle remnant H | 2H | 3H |
|---|---|---|---|---|---|---|---|---|---|---|
| Comparative Example 5 | A3-C6 | KBM-5103 | LIGHT ESTER HO-250(N) | C3 | 0.6 | 0.9 | 0.5% | C | C | C |

(*1) Particles were separated

TABLE 3

| | (A) Metal oxide particles | Surface treatment coupling agent of particles (A) | Compound for forming binder resin (B) | (C) | (C)/((B) + (C)) | B/A | Reflec- tivity | Particle remnant H | 2H | 3H |
|---|---|---|---|---|---|---|---|---|---|---|
| Example 35 | A3-C6 | KBM-5103 | KAYARAD DPHA | C4 | 0.6 | 0.7 | 1.4% | A | A | A |
| Example 36 | A3-C6 | KBM-5103 | KAYARAD DPHA | C3 | 0.6 | 0.7 | 1.3% | A | A | A |
| Example 37 | A3-C6 | KBM-5103 | KAYARAD DPHA | C2 | 0.6 | 0.7 | 1.1% | A | A | A |
| Example 38 | A3-C6 | KBM-5103 | KAYARAD DPHA | C1 | 0.6 | 0.7 | 1.4% | A | A | A |
| Example 39 | A3-C5 | C5 | KAYARAD DPHA | — | — | 0.8 | 1.2% | A | A | B |
| Example 40 | A3-C4 | C4 | KAYARAD DPHA | — | — | 0.8 | 1.2% | A | A | A |
| Example 41 | A3-C3 | C3 | KAYARAD DPHA | — | — | 0.8 | 1.4% | A | A | A |
| Example 42 | A3-C2 | C2 | KAYARAD DPHA | — | — | 0.8 | 1.6% | A | A | A |
| Example 43 | A3-C1 | C1 | KAYARAD DPHA | — | — | 0.8 | 1.0% | A | A | A |
| Example 44 | A3-C5 | C5 | KAYARAD DPHA | C5 | 0.6 | 0.7 | 1.6% | A | A | B |
| Example 45 | A3-C4 | C4 | KAYARAD DPHA | C4 | 0.6 | 0.7 | 1.5% | A | A | A |
| Example 46 | A3-C3 | C3 | KAYARAD DPHA | C3 | 0.6 | 0.7 | 1.6% | A | A | A |
| Example 47 | A3-C2 | C2 | KAYARAD DPHA | C2 | 0.6 | 0.7 | 1.4% | A | A | A |
| Example 48 | A3-C1 | C1 | KAYARAD DPHA | C1 | 0.6 | 0.7 | 1.4% | A | A | A |
| Example 49 | A3-C6 | KBM-5103 | A-DPH | C3 | 0.6 | 0.7 | 1.1% | A | A | A |
| Example 50 | A3-C6 | KBM-5103 | KAYARAD PET-30 | C3 | 0.6 | 0.7 | 1.4% | A | A | B |
| Example 51 | A3-C6 | KBM-5103 | A-TMMT | C3 | 0.6 | 0.7 | 1.3% | A | A | B |

In Tables 2 and 3, (C)/((B)+(C)) was a mass ratio of a content of the compound (C) to a total content of the compound (B) and the compound (C).

In Examples 19 to 28 and 39 to 48, compounds corresponding to the compound (C) were used as the surface treatment coupling agent of the metal oxide particles (A) (corresponding to the second embodiment described above).

The compounds used the shown below.

IRGACURE 127; Photopolymerization initiator (manufactured by BASF Japan Ltd.)

KE-S10: EPOSTAR KE-S10 manufactured by Nippon Shokubai Co., Ltd.

KE-S30: EPOSTAR KE-S30 manufactured by Nippon Shokubai Co., Ltd.

[Synthesization of Silica Particles A1]

67.54 kg of methyl alcohol and 26.33 kg of 28 mass % ammonia water (water and catalyst) were put into a reaction vessel having a volume of 200 L and comprising a stirrer, a dropwise adding device, and a thermometer, and a temperature thereof was adjusted to 33° C. with stirring. Meanwhile, a liquid obtained by dissolving 12.70 kg of tetramethoxysilane in 5.59 kg of methyl alcohol was put into the dropwise adding device. While the temperature of the reaction vessel was maintained to 33° C., the liquid was dropwisely added from the dropwise adding device over one hour. After the dropwise adding, stirring was performed while the temperature of the liquid was maintained at the temperature described above for one additional hour, such that hydrolyzation and condensation of tetramethoxysilane were performed so as to obtain a dispersion liquid containing a silica particle precursor. This dispersion liquid was flush-dried in the conditions of a heating tube temperature of 175° C. and a pressure reduction degree of 200 torr (27 kPa) by using an instant vacuum evaporation device (CRUX SYSTEM CVX-8B type manufactured by Hosokawa Micron Group), so as to obtain silica particles A1. The average particle diameter was 200 nm, and the dispersion degree (Cv value) of the particle diameter was 3.5%.

[Production of Baked Silica Particles A2]

5 kg of the silica particles A1 were put into a crucible, baked for one hour at 1,050° C. by using an electric furnace, cooled, and pulverized by a pulverizer, so as to obtain baked silica particles before classification. Baked silica particles A2 were obtained by performing crushing and classification by using a jet pulverization classifier (IDS-2 manufactured by Nippon Pneumatic Mfg. Co., Ltd.). An average particle diameter of the obtained silica particles was 200 nm, and the dispersion degree (Cv value) of the particle diameter was 3.5%.

[Production of Silane Coupling Agent-Treated Silica Particles A3-C1 to A3-C6]

5 kg of the baked silica particles A2 before classification were put into a Henschel mixer (FM20J type manufactured by Nippon Coke & Engineering Co., Ltd.) having a volume of 20 L and comprising a heating jacket. While the baked silica particles A2 were stirred, a liquid obtained by dissolving 45 g of C1 to C6 in 90 g of methyl alcohol was dropwisely added and mixed. Thereafter, the temperature was raised over one hour to 150° C. while mixing and stirring and maintained at 150° C. for 12 hours, so as to perform a heating treatment. In the heating treatment, while a scraping device constantly was rotated in a reverse direction of stirring blades, wall attachment was scraped. Appropriately, the wall attachment was scraped off by using a spatula. After the heating, cooling was performed, crushing and classification were performed by using a jet pulverization classifier, so as to obtain silane coupling agent-treated silica particles A3-C1 to A3-C6. Average particle diameters of all the particles were 210 nm, and the dispersion degrees (Cv values) of the particle diameters were 3.7%.

[C1]

13.6 g of KBE-9007 manufactured by Shin-Etsu Chemical Co., Ltd., 16.4 g of pentaerythritol triacrylate, 0.1 g of dibutyltin dilaurate, and 70.0 g of toluene were added into a flask with a reflux condenser and a thermometer, and stirred for 12 hours at room temperature. After stirring, 500 ppm of methyl hydroquinone was added, distillation under reduced pressure was performed, so as to obtain C1.

C1

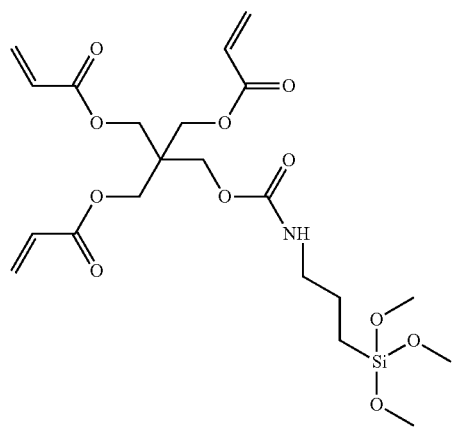

[C2]

9.1 g of KBE-9007 manufactured by Shin-Etsu Chemical Co., Ltd., 20.9 g of 1,3-diacryloyloxy-2-propanol, 0.1 g of dibutyltin dilaurate, and 70.0 g of toluene were added into a flask with a reflux condenser and a thermometer, and stirred for 12 hours at room temperature. After stirring, 500 ppm of methyl hydroquinone was added, distillation under reduced pressure was performed, so as to obtain C2.

C2

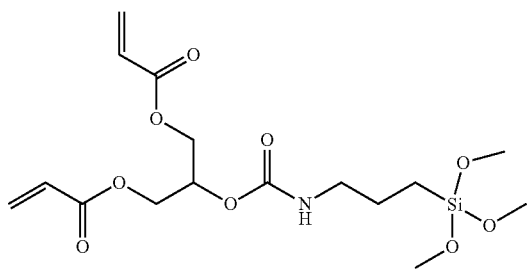

[C3]

19.3 g of KBE-9007 manufactured by Shin-Etsu Chemical Co., Ltd., 3.9 g of glycerin 1,3-bisacrylate, 6.8 g of 2-hydroxyethyl acrylate, 0.1 g of dibutyltin dilaurate, and 70.0 g of toluene were added into a flask with a reflux condenser and a thermometer, and stirred for 12 hours at room temperature. After stirring, 500 ppm of methyl hydroquinone was added, distillation under reduced pressure was performed, so as to obtain C3.

C3
C4

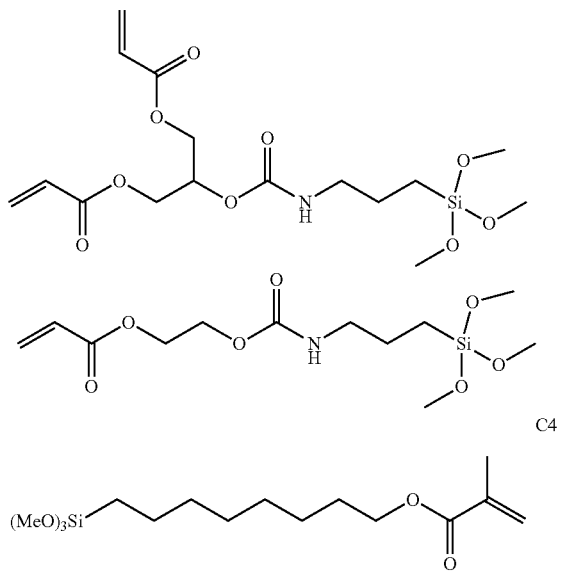

[C5]

9.1 g of KBE-9007 manufactured by Shin-Etsu Chemical Co., Ltd., 20.9 g of dipentaerythritol pentaacrylate, 0.1 g of dibutyltin dilaurate, and 70.0 g of toluene were added into a flask with a reflux condenser and a thermometer, and stirred for 12 hours at room temperature. After stirring, distillation under reduced pressure was performed, so as to obtain C5.

C5

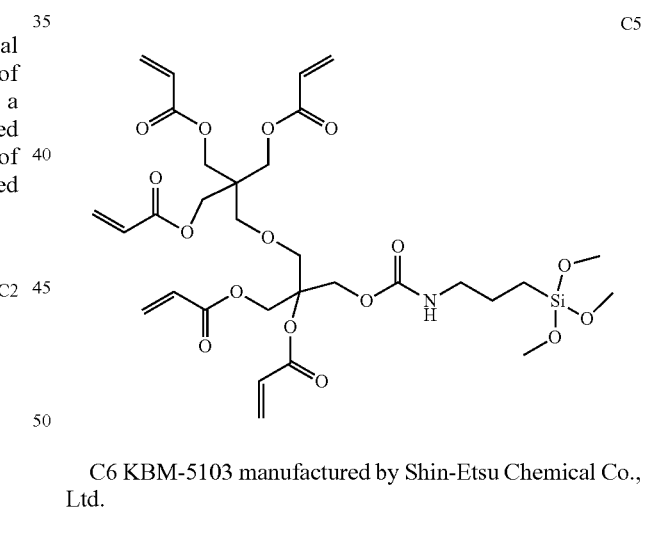

C6 KBM-5103 manufactured by Shin-Etsu Chemical Co., Ltd.

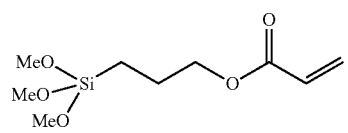

[C7] X-40-2671G manufactured by Shin-Etsu Chemical Co., Ltd.

X-40-2671G was represented by in General Formula (2) disclosed in JP2007-41495A. Here, $R^1$ represents hydrogen atom, Y represents *—COO—**, L represents a linking group having 3 carbon atoms ($C_3H_6$), $R^2$, $R^3$, and $R^4$ represent methoxy groups, and $R^5$ and $R^6$ represent methyl groups. An weight-average molecular weight was 1,300 to 1,900.

[C8] KBM-303 manufactured by Shin-Etsu Chemical Co., Ltd.

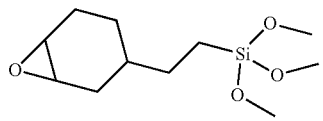 [SMILES: CO[Si](CCC1CCC2OC2C1)(OC)OC]

[C9] KBM-503 manufactured by Shin-Etsu Chemical Co., Ltd.

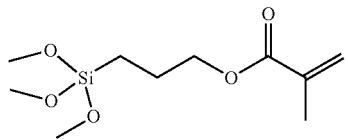 [SMILES: C=C(C)C(=O)OCCC[Si](OC)(OC)OC]

KAYARAD PET-30: Mixture of pentaerythritol tetraacrylate and pentaerythritol triacrylate (manufactured by Nippon Kayaku Co., Ltd.)

KAYARAD DPHA: Mixture of dipentaerythritol pentaacrylate and dipentaerythritol hexaacrylate (manufactured by Nippon Kayaku Co., Ltd.)

LIGHT ESTER HO-250 (N): hydroxylethyl methacrylate (manufactured by Kyoeisha Chemical Co., Ltd.)

A-DPH: Dipentaerythritol hexaacrylate (manufactured by Shin-nakamura Chemical Co., Ltd.)

A-TMMT: Pentaerythritol tetraacrylate (manufactured by Shin-nakamura Chemical Co., Ltd.)

Examples of Second Embodiment of the Invention and Comparative Examples

[Synthesization of Silica Particles a-1]

67.54 kg of methyl alcohol and 26.33 kg of 28 mass % ammonia water (water and catalyst) were put into a reaction vessel having a volume of 200 L and comprising a stirrer, a dropwise adding device, and a thermometer, and a temperature thereof was adjusted to 33° C. with stirring. Meanwhile, a liquid obtained by dissolving 12.70 kg of tetramethoxysilane in 5.59 kg of methyl alcohol was put into the dropwise adding device. While the temperature of the reaction vessel was maintained to 33° C., the liquid was dropwisely added from the dropwise adding device over one hour. After the dropwise adding, stirring was performed while the temperature was maintained at the temperature described above for one additional hour, such that hydrolyzation and condensation of tetramethoxysilane were performed so as to obtain a dispersion liquid in which silica particle precursors were contained. This dispersion liquid was flush-dried in the conditions of a heating tube temperature of 175° C. and a pressure reduction degree of 200 torr (27 kPa) by using an instant vacuum evaporation device (CRUX SYSTEM CVX-8B type manufactured by Hosokawa Micron Group), so as to obtain silica particles a-1. The average particle diameter was 200 nm, and the dispersion degree (Cv value) of the particle diameter was 3.5%.

[Production of Baked Silica Particles b-1]

5 kg of the silica particles a-1 were put into a crucible, baked for one hour at 900° C. by using an electric furnace, cooled, and pulverized by a pulverizer, so as to obtain baked silica particles before classification. Baked silica particles b-1 were obtained by performing crushing and classification by using a jet pulverization classifier (IDS-2 manufactured by Nippon Pneumatic Mfg. Co., Ltd.). An average particle diameter of the obtained silica particles was 200 nm, and the dispersion degree (Cv value) of the particle diameter was 3.5%.

[Production of Baked Silica Particles b-2]

5 kg of the silica particles a-1 were put into a crucible, baked for two hours at 900° C. by using an electric furnace, cooled, and pulverized by a pulverizer, so as to obtain baked silica particles before classification. Baked silica particles b-2 were obtained by performing crushing and classification by using a jet pulverization classifier (IDS-2 manufactured by Nippon Pneumatic Mfg. Co., Ltd.). An average particle diameter of the obtained silica particles was 200 nm, and the dispersion degree (Cv value) of the particle diameter was 3.5%.

[Production of Baked Silica Particles b-3]

5 kg of the silica particles a-1 were put into a crucible, baked for one hour at 1,050° C. by using an electric furnace, cooled, and pulverized by a pulverizer, so as to obtain baked silica particles before classification. Baked silica particles b-3 were obtained by performing crushing and classification by using a jet pulverization classifier (IDS-2 manufactured by Nippon Pneumatic Mfg. Co., Ltd.). An average particle diameter of the obtained silica particles was 200 nm, and the dispersion degree (Cv value) of the particle diameter was 3.5%.

[Production of Baked Silica Particles b-4]

2 kg of the respective silica particles b-1 and b-3 were put into a high speed stirring and mixing machine (manufactured by DULTON Co., Ltd.), stirred for 30 minutes, and extracted, so as to obtain baked silica particles b-4. An average particle diameter of the obtained silica particles was 200 nm, and the dispersion degree (Cv value) of the particle diameter was 23%.

[Production of Baked Silica Particles b-5]

25 kg of silica-based hollow particle dispersion sol (THRULYA 1420-120 manufactured by JGC C&C, average particle diameter: 120 nm, concentration: 20.5 weight %, dispersion medium: isopropanol, and particle refractive index: 1.20) was put into a crucible, and isopropanol was evaporated in a 100° C. oven. The resultant was baked for one hour at 1,050° C. by using an electric furnace, cooled, and pulverized by a pulverizer, so as to obtain baked silica particles before classification. Baked silica particles b-5 were obtained by performing crushing and classification by using a jet pulverization classifier (IDS-2 type manufactured by Nippon Pneumatic Mfg. Co., Ltd.). An average particle diameter of the obtained silica particles was 120 nm, and the dispersion degree (Cv value) of the particle diameter was 5.0%.

[Production of Silane Coupling Agent-Treated Silica Particles c-1]

5 kg of the baked silica particles b-2 before classification were put into a Henschel mixer (FM20J type manufactured by Nippon Coke & Engineering Co., Ltd.) having a volume of 20 L and comprising a heating jacket. While the baked silica particles b-2 were stirred, a liquid obtained by dissolving 45 g of 3-acryloxypropyltrimethoxysilane (KBM5103 manufactured by Shin-Etsu Chemical Co., Ltd.) in 90 g of methyl alcohol was dropwisely added and mixed. Thereafter, the temperature was raised over one hour to 150° C. while mixing and stirring and maintained at 150° C. for 12 hours, so as to perform a heating treatment. In the heating treatment, while a scraping device constantly was rotated in a reverse direction of stirring blades, wall attachment was scraped. Appropriately, the wall attachment was scraped off by using a spatula. After the heating, cooling was performed, crushing and classification were performed by using a jet pulverization classifier, so as to obtain silane coupling agent-treated silica particles c-1. Average particle diameters of all the particles were 210 nm, and dispersion degrees (Cv values) of the particle diameters were 3.7%.

[Measuring of the Amount of the Hydroxyl Groups of Particle Surface]

Signal strengths Q2 and Q1 were measured in the following conditions by using solid $^{29}$Si NMR, so as to calculate the amount of the hydroxyl groups (Q1×3+Q2×2).

Measuring method: $^{29}$Si CP/MAS
Observation frequency: $^{29}$Si: 59.63 MHz
Width of spectrum: 22675.74 Hz
Number of integrating accumulation: 2,000 times
Contact time: 5 ms
90° Pulse: 4.8 μs
Measurement waiting time: 2 seconds
Number of MAS rotations: 3 kHz
Chemical shift: Q2 was −91 to −94 ppm, and Q1 was −100 to −102 ppm.

[Measurement of Indentation Hardness of Metal Oxide Particles]

8 g of the respective metal oxide particles, 0.3 g of IRGACURE 184 (manufactured by BASF Japan Ltd.), and 7.7 g of KAYARAD PET30 (manufactured by Nippon Kayaku Co., Ltd.) were added to 91 g of ethanol, stirred for 10 minutes, and dispersed for 10 minutes by an ultrasonic disperser, so as to obtain a 15 mass % dispersion liquid. A glass plate was coated with this dispersion liquid by a wet application amount of about 3 ml/m$^2$, hardening was performed by irradiation with ultraviolet light in an irradiation amount of 600 mJ/cm$^2$ using an air-cooling metal halide lamp, while nitrogen purge was performed so as to have an atmosphere in which an oxygen concentration was 0.1 volume % or less. Thereafter, it was observed by a SEM, that metal oxide particles are not overlapped by one or more steps. With respect to this sample, indentation hardness of metal oxide particles by using a tribo indenter (TI-950 manufactured by Hysitron, Inc.) and a diamond indenter having a diameter of 1 μm, in the measurement condition of indentation load of 0.05 mN.

[Production of Antireflection Films A-1 and A-2]

10 g of the silica particles a-1 were added to a 10 g of ethanol put into a glass container, and ultrasonic waves were applied until a solid matter was not visually observed, so as to obtain a milky white suspension. Subsequently, 15 g of an acryl monomer (M-350 manufactured by Toagosei Co., Ltd.) was added to a suspension in a glass container and stirred, the glass container was put into a drying machine maintained to 45° C., about 5 g of ethanol was dried from the suspension, and 0.2 g of a photopolymerization initiator ("DAROCUR 1173" manufactured by Ciba Specialty Chemicals plc.) was added, so as to obtain a coating liquid A-1 for forming the antireflection layer in which silica particles are dispersed in an acryl monomer.

Subsequently, the coating liquid A-1 for forming the antireflection layer was dropwisely added on the substrate of the glass substrate of a 100 mm square (alkali glass manufactured by AGC Techno Glass Co., Ltd.) which was subjected to surface cleaning with an UV/ozone cleaner in advance and the glass substrate was rotated by using a spin coater in conditions of 200 rpm for 120 seconds and 600 rpm for 120 seconds, so as to coat the entire surface of the glass substrate with the coating liquid A-1 for forming the anti-reflection layer. Thereafter, the substrate coated with the coating liquid A-1 for forming the antireflection layer was transported to a glove box in the nitrogen atmosphere and irradiated for one minute with an UV curing lamp in the glove box such that the acryl monomer was hardened by photopolymerization, and thus a transparent resin layer in which silica particles were dispersed in an acryl resin was obtained on the glass substrate.

Subsequently, a plasma treatment was performed on the surface of the obtained transparent rosin layer in the condition of 13.56 MHz by using a high frequency plasma device, the acryl resin in the transparent resin layer was etched, and an antireflection film A-1 was obtained by exposing an irregular shape on the surface. The plasma treatment was performed by applying a high frequency of 50 W for 30 seconds, in a condition of pressure of 2.7 Pa while gas in the composition of oxygen:argon=1:1 was introduced. The film thickness of the obtained antireflection layer was 20 μm.

Except for using the silica particles b-1 instead of the silica particles a-1 (a coating liquid A-2 for forming an antireflection layer), an antireflection film A-2 was produced in the same method as the antireflection film A-1. The film thickness of the obtained antireflection film was 20 μm.

[Production of Antireflection Films B-1 to B-4, and C-1 to C-11]

(Preparation of Coating Liquid for Forming Antireflection Layer)

Respective components were put into a mixing tank so as to be the composition of Table 4 below, were stirred for 60 minutes, were dispersed by an ultrasonic disperser for 30 minutes, and were filtrated with a polypropylene filter having a hole diameter of 5 μm, so as to obtain a coating liquid for forming an antireflection layer.

Numerical values of the respective components in Table 4 below refer to amounts (parts by mass) added. The unit of the coating liquid concentration is "mass %". With respect to metal oxide particles, an amount of hydroxyl groups, indentation hardness, and a degree of dispersion (Cv value) of an average primary particle diameter are described.

TABLE 4

| | | B-1 | B-2 | B-3 | B-4 | C-1 | C-2 | C-3 | C-4 |
|---|---|---|---|---|---|---|---|---|---|
| Polymerizable compound for forming binder resin | KAYARAD PET30 (Hydroxyl group equivalent: 533) | 72 | | | | 72 | | | |
| | KAYARAD DPHA (Hydroxyl group equivalent: 1102) | | 72 | | | | 72 | | |
| | ARONIX M-405 (Hydroxyl group equivalent: 3799) | | | 72 | | | | 72 | |
| | ARONIX M-450 (Hydroxyl group equivalent: 6986) | | | | 72 | | | | 72 |

TABLE 4-continued

|  |  |  |  |  |  |  |  |  |  |
|---|---|---|---|---|---|---|---|---|---|
| Metal oxide particles | Silica particles a-1 (Hydroxyl group equivalent: $2.85 \times 10^{-1}$, 330 MPa, Cv value 3.5%) |  |  |  |  |  |  |  |  |
|  | Baked silica particles b-1 (Hydroxyl group equivalent: $9.60 \times 10^{-2}$, 400 MPa, Cv value 3.5%) | 19 | 19 | 19 | 19 | 75 | 75 | 75 | 75 |
|  | Baked silica particles b-2 (Hydroxyl group equivalent: $4.85 \times 10^{-2}$, 450 MPa, Cv value 3.5%) |  |  |  |  |  |  |  |  |
|  | Baked silica particles b-3 (Hydroxyl group equivalent: $7.50 \times 10^{-3}$, 500 MPa, Cv value 3.5%) |  |  |  |  |  |  |  |  |
|  | Baked silica particles b-4 (Hydroxyl group equivalent: $1.21 \times 10^{-2}$, 455 MPa, Cv value 23%) |  |  |  |  |  |  |  |  |
|  | Baked silica particles b-5 (Hydroxyl group equivalent: $4.90 \times 10^{-3}$, 90 MPa, Cv value 5.0%) |  |  |  |  |  |  |  |  |
|  | SEAHOSTAR KE-S30 (Hydroxyl group equivalent: $4.40 \times 10^{-3}$, 530 MPa, Cv value 3.0%) |  |  |  |  |  |  |  |  |
|  | Silane coupling agent-treated silica particles c-1 (Hydroxyl group equivalent: $4.32 \times 10^{-3}$, 450 MPa, Cv value 3.7%) |  |  |  |  |  |  |  |  |
| Others | IRGACURE 184 | 3 | 3 | 3 | 3 | 3 | 3 | 3 | 3 |
|  | Ethanol | 141 | 141 | 141 | 141 | 850 | 850 | 850 | 850 |
| Coating liquid concentration |  | 40.0% | 40.0% | 40.0% | 40.0% | 15.0% | 15.0% | 15.0% | 15.0% |
| Formulation ratio of particle/resin (Mass ratio) |  | 21/79 | 21/79 | 21/79 | 21/79 | 51/49 | 51/49 | 51/49 | 51/49 |

|  |  |  | C-5 | C-6 | C-7 | C-8 | C-9 | C-10 | C-11 |
|---|---|---|---|---|---|---|---|---|---|
| Polymerizable compound for forming binder resin | KAYARAD PET30 (Hydroxyl group equivalent: 533) |  |  |  |  |  | 72 |  |  |
|  | KAYARAD DPHA (Hydroxyl group equivalent: 1102) |  | 72 | 72 | 72 | 72 |  | 72 | 72 |
|  | ARONIX M-405 (Hydroxyl group equivalent: 3799) |  |  |  |  |  |  |  |  |
|  | ARONIX M-450 (Hydroxyl group equivalent: 6986) |  |  |  |  |  |  |  |  |
| Metal oxide particles | Silica particles a-1 (Hydroxyl group equivalent: $2.85 \times 10^{-1}$, 330 MPa, Cv value 3.5%) |  |  |  |  |  |  |  |  |
|  | Baked silica particles b-1 (Hydroxyl group equivalent: $9.60 \times 10^{-2}$, 400 MPa, Cv value 3.5%) |  |  |  |  |  |  |  |  |
|  | Baked silica particles b-2 (Hydroxyl group equivalent: $4.85 \times 10^{-2}$, 450 MPa, Cv value 3.5%) |  | 75 |  |  |  |  |  |  |
|  | Baked silica particles b-3 (Hydroxyl group equivalent: $7.50 \times 10^{-3}$, 500 MPa, Cv value 3.5%) |  |  | 75 |  |  |  |  |  |
|  | Baked silica particles b-4 (Hydroxyl group equivalent: $1.21 \times 10^{-2}$, 455 MPa, Cv value 23%) |  |  |  |  |  |  | 75 |  |
|  | Baked silica particles b-5 (Hydroxyl group equivalent: $4.90 \times 10^{-3}$, 90 MPa, Cv value 5.0%) |  |  |  |  |  |  |  | 75 |
|  | SEAHOSTAR KE-S30 (Hydroxyl group equivalent: $4.40 \times 10^{-3}$, 530 MPa, Cv value 3.0%) |  |  |  |  |  | 75 |  |  |
|  | Silane coupling agent-treated silica particles c-1 (Hydroxyl group equivalent: $4.32 \times 10^{-3}$, 450 MPa, Cv value 3.7%) |  |  |  | 75 | 52 |  |  |  |
| Others | IRGACURE 184 |  | 3 | 3 | 3 | 3 | 3 | 3 | 3 |
|  | Ethanol |  | 850 | 850 | 850 | 850 | 850 | 850 | 850 |
| Coating liquid concentration |  |  | 15.0% | 15.0% | 15.0% | 13.0% | 15.0% | 15.0% | 15.0% |
| Formulation ratio of particle/resin (Mass ratio) |  |  | 51/49 | 51/49 | 51/49 | 42/58 | 42/58 | 51/49 | 42/58 |

The respective compounds used are provided below.

KAYARAD PET30 (manufactured by Nippon Kayaku Co., Ltd.): Mixture of 60% pentaerythritol triacrylate and 40% pentaerythritol tetraacrylate KAYARAD DPHA (manufactured by Nippon Kayaku Co., Ltd.): Mixture of 50% dipentaerythritol pentaacrylate and 50% dipentaerythritol hexaacrylate ARONIX M-405 (manufactured by Toagosei Co., Ltd.): Dipentaerythritol pentaacrylate 15% and dipentaerythritol hexaacrylate 85%

ARONIX M-450 (manufactured by Toagosei Co., Ltd.): Mixture of pentaerythritol triacrylate 5% and pentaerythritol tetraacrylate 95%

EPOSTAR KE-S30 (manufactured by Nippon Shokubai Co., Ltd.): Average primary particle diameter of about 300 nm IRGACURE 184: Photopolymerization initiator (manufactured by BASF Japan Ltd.)

(Production of Antireflection Films B-1 to B-4)

A cellulose triacetate film (TDH60UF, manufactured by Fujifilm Corporation) as a transparent substrate having a thickness of 60 µm was coated with a coating liquid B-1 for forming an antireflection layer by using a gravure coater in a wet application amount of about 2.8 ml/m$^2$, drying was performed at 120° C. for five minutes, and the coating liquid was irradiated and hardened with an ultraviolet ray in an irradiation amount of 600 mJ/cm$^2$ with an air-cooling metal halide lamp while nitrogen purge was performed such that an oxygen concentration become an atmosphere of 0.1 volume % or less, so as to produce an antireflection film B-1. At this point, a wet application amount was finely adjusted, particle occupancy was measured, and an antireflection film having highest particle occupancy was employed as the antireflection film B-1. Except for using coating liquids B-2 to B-4 for forming an antireflection layer instead of the coating liquid B-1 for forming the antireflection layer, antireflection films B-2 to B-4 were produced in the same method.

(Preparing of Composition for Forming Hardcoat Layer)

10.5 parts by mass of methyl acetate, 10.5 parts by mass of MEK, 22.52 parts by mass of NK ester A-TMMT (manufactured by Shin-nakamura Chemical Co., Ltd.), 6.30 parts by mass of AD-TMP (manufactured by Shin-nakamura Chemical Co., Ltd.), and 0.84 parts by mass of IRGACURE 184 were put into a mixing tank, were stirred, and were filtrated with a polypropylene filter having a hole diameter of 0.4 µm, so as to obtain a coating liquid for a hardcoat layer (concentration of solid content: 58 mass %).

(Production of Antireflection Films C-1 to C-11)

A cellulose triacetate film (TDH60UF, manufactured by Fujifilm Corporation) was coated with a coating liquid for forming a hardcoat layer, an ultraviolet ray was irradiated and hardened by an air-cooling metal halide lamp in an irradiation amount of 30 mJ/cm$^2$ during nitrogen purge, so as to form a hardcoat layer having a film thickness of 6 µm. In this manner, a substrate with a hardcoat layer was produced.

The hardcoat layer of the substrate with the hardcoat layer was coated with a coating liquid C-1 for forming an antireflection layer by using a gravure coater in a wet application amount of about 2.8 ml/m$^2$, drying was performed at 120° C. for five minutes, and the coating liquid was irradiated and hardened with an ultraviolet ray in an irradiation amount of 600 mJ/cm$^2$ with air air-cooling metal halide lamp while nitrogen purge was performed such that an oxygen concentration become an atmosphere of 0.1 volume % or less, so as to produce an antireflection film C-1. At this point, a wet application amount was finely adjusted, particle occupancy was measured, and an antireflection film having highest particle occupancy was employed as the antireflection film C-1. Except for using coating liquids C-2 to C-11 for forming an antireflection layer instead of the coating liquid C-1 for forming the antireflection layer and causing the wet application amount to be the same as the wet application amount when the antireflection film C-1 was formed, antireflection films C-2 to C-11 were produced in the same method.

(Evaluation of Antireflection Film)

Various characteristics of the antireflection films were evaluated by methods below. Results thereof are provided in Table 5.

(Integral Reflectivity)

In a state in which back surface reflection was removed by roughening a back surface of an antireflection film (on a cellulose triacetate film side) with a sand paper and treating the back surface with a black ink, an adapter ARV-474 was mounted on a spectrophotometer V-550 (manufactured by JASCO Corporation), integral reflectivity was measured in an area of a wavelength of 380 to 780 nm, and average reflectivity was calculated an angle of incidence of 5°, so as to evaluate antireflection properties.

(Haze)

Uniformity of the surface was evaluated by the haze value. If the particles aggregate with each other and are non-uniform, the haze increases. Conforming to JIS-K7136, an obtained total haze value (%) of the film was measured. In the device, a haze meter NDH4000 manufactured by Nippon Denshoku Industries Co., Ltd. was used.

Haze value was 2% or less . . . . There was no cloudiness feeling and uniformity of the surface was excellent.

Haze value was 5% or less . . . . There was slightly cloudiness feeling but there was no problem in appearance.

Haze value was greater than 5% . . . . Cloudiness feeling was great, but appearance was deteriorated.

(Durability of Moth Eye Structure with Respect to Pressure in Thickness Direction)

A glass plate was bonded to a substrate side of an antireflection film sample by using a diamond indenter having a diameter of 25 µm, a scratch test was performed on an antireflection layer surface in a load of 20 g and a condition of 810 mm/min, and a surface of the antireflection layer was observed and evaluated according to criteria below.

A: No scratches were seen after test

B: Scratches were slightly seen after test but there was no problem

C: Scratches were considerably seen after test (B/A, Half-Width of Distribution of A)

An antireflection film sample was cut with a microtome to have a cross section, and the cross section was etched for 10 minutes after carbon vapor deposition. The cross section was observed and imaged at 20 angles of view at 5,000 times by using a scanning-type electron microscope (SEM). Distances A between peaks of adjacent convex portions and distances B between centers between peaks of adjacent convex portions and concave portions were measured at 100 points, with respect to interfaces made by the air and the samples with the obtained images, and an average value of B/A was calculated. A half-width of the distribution of A was calculated.

(Pencil Hardness)

Pencil hardness was evaluated disclosed in JIS K5400. A sample of the antireflection film was damped at 25° C. in relative humidity of 60% RH, for three hours. A test was performed on an antireflection layer by using a pencil for a test regulated by JIS S6006, and an evaluation was performed according to criteria below.

A: No scratches were seen after test

B: Scratches were slightly seen after test but there was no problem

C: Scratches were considerably seen after test

TABLE 5

| Anti-reflection film | B/A | Half-width of distribution of A | Integral reflectivity | Durability of moth eye structure with respect to pressure in thickness direction | Haze | |
|---|---|---|---|---|---|---|
| A-1 | 0.60 | 28 nm | 0.4% | C | 4.5% | Comparative Example |
| A-2 | 0.60 | 200 nm | 2.0% | B | 32.0% | Comparative Example |
| B-1 | 0.60 | 30 nm | 0.4% | B | 1.2% | Example |
| B-2 | 0.60 | 20 nm | 0.4% | B | 0.8% | Example |
| B-3 | 0.60 | 40 nm | 0.5% | B | 2.0% | Example |
| B-4 | 0.60 | 60 nm | 0.7% | B | 3.0% | Example |
| C-1 | 0.60 | 40 nm | 1.0% | B | 1.2% | Example |
| C-2 | 0.60 | 30 nm | 1.0% | B | 0.8% | Example |
| C-3 | 0.60 | 50 nm | 1.2% | B | 2.0% | Example |
| C-4 | 0.60 | 70 nm | 1.5% | B | 3.0% | Example |
| C-5 | 0.60 | 40 nm | 1.0% | A | 1.0% | Example |
| C-6 | 0.60 | 60 nm | 1.0% | A | 1.5% | Example |
| C-7 | 0.60 | 60 nm | 1.0% | A | 1.0% | Example |
| C-8 | 0.70 | 60 nm | 0.5% | A | 0.7% | Example |
| C-9 | 0.60 | 125 nm | 1.7% | B | 4.5% | Example |
| C-10 | 0.60 | 30 nm | 1.0% | A | 8.0% | Comparative Example |
| C-11 | 0.60 | 40 nm | 0.7% | C | 1.0% | Comparative Example |

TABLE 6

| Anti-reflection film | Pencil hardness 3H | Pencil hardness 4H | |
|---|---|---|---|
| A-1 | C | C | Comparative Example |
| A-2 | A | B | Comparative Example |
| C-1 | A | B | Example |
| C-2 | A | B | Example |
| C-3 | A | B | Example |
| C-4 | A | B | Example |
| C-5 | A | B | Example |
| C-6 | A | A | Example |
| C-7 | A | A | Example |
| C-8 | A | B | Example |
| C-9 | A | B | Example |
| C-10 | A | A | Comparative Example |
| C-11 | C | C | Comparative Example |

If Comparative Example samples A-1 and A-2 were compared with each other, durability of moth eye structure with respect to pressure in thickness direction improved by increasing indentation hardness of the particles, particles were able to be suppressed from cracking. However, it was understood that, since the binder resin did not have a hydroxyl group, dispersibility was bad, and haze and reflectivity were deteriorated. Meanwhile, in the samples B-1 to B-4, C-1 to C-4 of the examples, it was understood that, since the binder resins had hydroxyl groups, reflectivity and haze were excellent, and thus samples B-1, B-2, C-1, and C-2 were particularly excellent.

With respect to the indentation hardness of the particles, since the sample C-2 of the example showed favorable durability in the thickness direction, it was checked that the sample C-2 was more excellent than the samples C-5 and C-6 and also had an excellent effect in the pencil hardness test. The sample C-11 of the comparative example was compared at the same time, and it was checked that, this effect depends on indentation hardness of the particles, not decrease of amounts of hydroxyl of particle surfaces by baking.

The sample C-8 of the example was excellent in reflectivity, and it is considered that, this is caused by large B/A.

Example 2

[Synthesization of Silica Particles a-7]

101.01 kg of methyl alcohol and 6.58 kg of 28 mass % ammonia water (water and catalyst) were put into a reaction vessel having a volume of 200 L and comprising a stirrer, a dropwise adding device, and a thermometer, and a temperature thereof was adjusted to 33° C. with stirring. Meanwhile, a liquid obtained by dissolving 3.18 kg of tetramethoxysilane in 1.40 kg of methyl alcohol was put into the dropwise adding device. While the temperature of the reaction vessel was maintained to 33° C., the liquid was dropwisely added from the dropwise adding device over 45 minutes such that hydrolyzation and condensation of tetramethoxysilane were performed so as to obtain a dispersion liquid in which silica particle precursors were contained. This dispersion liquid was flush-dried in the conditions of a heating tube temperature of 175° C. and a pressure reduction degree of 200 torr (27 kPa) by using an instant vacuum evaporation device (CRUX-SYSTEM CVX-8B type manufactured by Hosokawa Micron Group), so as to obtain silica particles a-7. The average particle diameter was 90 nm, and the dispersion degree (Cv value) of particle diameter was 8%.

[Synthesization of Silica Particles a-8]

108.93 kg of methyl alcohol and 2.37 kg of 28 mass % ammonia water (water and catalyst) were put into a reaction vessel having a volume of 200 L and comprising a stirrer, a dropwise adding device, and a thermometer, and a temperature thereof was adjusted to 25° C. with stirring. Meanwhile, a liquid obtained by dissolving 1.14 kg of tetramethoxysilane in 0.50 kg of methyl alcohol was put into the dropwise adding device. While the temperature of the reaction vessel was maintained to 25° C., the liquid was dropwisely added from the dropwise adding device over one hour. After the dropwise adding, stirring was performed while the temperature was maintained at the temperature described above for one additional hour, such that hydrolyzation and condensation of tetramethoxysilane were performed so as to obtain a dispersion liquid in which silica particle precursors were contained. This dispersion liquid was flush-dried in the conditions of a heating tube temperature of 175° C. and a pressure reduction degree of 200 torr (27 kPa) by using an instant vacuum evaporation device (CRUX-SYSTEM CVX-8B type manufactured by Hosokawa Micron Group), so as to obtain silica particles a-8.

[Synthesization of Silica Particles a-9 to a-11]

Silica particles a-9 to a-11 were obtained in the same manner as the synthesization of the silica particles a-7 except for performing hydrolyzation and condensation of tetramethoxysilane with changing a time for dropwisly adding the liquid from the dropwise adding device respectively to 8 minutes, 20 minutes, and 50 minutes.

[Synthesization of Silica Particles a-12]

Silica particles a-12 were obtained in the same manner as the synthesization of the silica particles a-7 except for performing hydrolyzation and condensation of tetramethoxysilane with changing a time for dropwisely adding the liquid from the dropwise adding device to 60 minutes and also stirring for 20 minutes while temperature of the liquid was maintained in the temperature after dropwise addition was completed.

[Synthesization of the Silica Particles a-13]

Silica particles a-13 were obtained in the same manner as the synthesization of the silica particles a-12 except for changing a stirring time after dropwise addition was completed to 40 minutes.

[Production of Baked Silica Particles b-7]

5 kg of silica particles a-7 were put into crucible, were baked for one hour at 900° C. by using an electric furnace, cooled, and pulverized by a pulverizer, so as to obtain baked silica particles before classification. Baked silica particles b-7 were obtained by performing crushing and classification by using a jet pulverization classifier (IDS-2 type manufactured by Nippon Pneumatic Mfg. Co., Ltd.). An average particle diameter of the obtained silica particles was 90 nm, and the dispersion degree (Cv value) of the particle diameter was 8%.

[Production of Baked Silica Particles b-8 to b-13]

Baked silica particles b-8 to b-13 were produced in the same method as the baked silica particles b-7 except for changing the baked silica particles a-7 to the silica particles a-8 to a-13 and changing the baking time to two hours.

[Production of Silane Coupling Agent-Treated Silica Particles c-8]

5 kg of the baked silica particles b-8 before classification were put into a Henschel mixer (FM20J type manufactured by Nippon Coke & Engineering Co., Ltd.) having a volume of 20 L and comprising a heating jacket. While the baked silica particles b-8 were stirred, a liquid obtained by dissolving 600 g of 3-acryloxypropyltrimethoxysilane (KBM5103 manufactured by Shin-Etsu Chemical Co., Ltd.) in 1,200 g of methyl alcohol was dropwisely added and mixed. Thereafter, the temperature was raised over one hour to 150° C. while mixing and stirring and maintained at 150° C. for 12 hours, so as to perform a heating treatment. In the heating treatment, while a scraping device constantly was rotated in a reverse direction of stirring blades, wall attachment was scraped. Appropriately, the wall attachment was scraped off by using a spatula. After the heating, cooling was performed, crushing and classification were performed by using a jet pulverization classifier, so as to obtain silane coupling agent-treated silica particles c-8.

[Production of Silane Coupling Agent-Treated Silica Particles c-9 to c-13]

Silane coupling agent-treated silica particles c-9 to c-13 were produced in the same method as the silane coupling agent-treated silica particles c-8 except for changing the baked silica particles b-8 respectively to the baked silica particles b-9 to b-13, changing 3-acryloxypropyltrimethoxysilane respectively to 180 g, 129 g, 95 g, 82 g, and 75 g, and changing methyl alcohol respectively to 360 g, 257 g, 189 g, 164 g, and 150 g.

[Production of antireflection films B-5 to B-6, and C-12 to C-24]

(Preparation of Coating Liquid for Forming Antireflection Layer)

Respective components were put into a mixing tank so as to be the composition of Table 4 below, were stirred for 60 minutes, were dispersed by an ultrasonic disperser for 30 minutes, and were filtrated with a polypropylene filter having a hole diameter of 5 μm, so as to obtain a coating liquid for forming an antireflection layer.

In Table 7 below, numerical values of the respective components refer to amounts (parts by mass) added. The unit of the coating liquid concentration is "mass %". With respect to metal oxide particles and other particles, average primary particle diameters, amounts of hydroxyl groups, indentation hardness, and degrees of dispersion (Cv value) of average primary particle diameters are described.

(Frequency of Fine Particles)

A frequency of fine particles is calculated by a ratio of the numbers of the fine particles when it is considered that metal oxide particles formulated all have a particle diameter which is the average primary particle diameter. That is, for example, in a case where X parts by weight of fine particles having an average primary particle diameter r2 (r2 is 50 nm or greater and less than 120 nm) and a specific weight s2 were formulated with 1 part by weight of fine particles having an average primary particle diameter r1 (r1 is 120 nm to 250 nm) and a specific weight s1, a frequency is represented by $(r1^3 \cdot s1 \cdot X)/(r2^3 \cdot S2)$.

In a case where a frequency of metal oxide particles included in an antireflection layer was measured, the frequency can be measured by an electron micrograph. For example, an antireflection film was observed by appropriate magnification (about 5,000 times) by SEM observation from the surface side, diameters of 100 primary particles were respectively measured, volumes thereof were calculated, an average primary particle diameter of the fine particles of 120 nm to 250 nm was calculated as r1, and an average primary particle diameter of the fine particles of 50 nm or greater and less than 120 nm was calculated as r2.

TABLE 7

| | | B-5 | B-6 | C-12 | C-13 | C-14 | C-15 | C-16 | C-17 |
|---|---|---|---|---|---|---|---|---|---|
| Polymerizable compound for forming binder resin | KAYARAD DPHA (Amount of hydroxyl groups: 1102) | 69 | 69 | 72 | 72 | 70 | 65 | 56 | 48 |
| Metal oxide particles | Baked silica particles b-1 (200 nm, amount of hydroxyl groups: 9.60 × 10⁻², 400 MPa, Cv value: 3.5%) | 19 | 19 | | | | | | |
| | Silane coupling agent-treated silica particles c-1 (210 nm, amount of hydroxyl groups: 4.32 × 10⁻³, 450 MPa, Cv value: 3.7%) | | | 75 | 75 | 75 | 75 | 75 | 75 |
| | Baked silica particles b-7 (90 nm, amount of hydroxyl groups: 8.5 × 10⁻², 400 MPa, Cv value: 8%) | | 3 | | | | | | |
| | Silane coupling agent-treated | | | | 0.1 | | | | |

TABLE 7-continued

| | | | | | | | | | |
|---|---|---|---|---|---|---|---|---|---|
| | silica particles c-8 (15 nm, amount of hydroxyl groups: $1.00 \times 10^{-2}$, 450 MPa, Cv value: 20%) Silane coupling agent-treated silica particles c-9 (50 nm, amount of hydroxyl groups: $1.40 \times 10^{-2}$, 450 MPa, Cv value: 15%) Silane coupling agent-treated silica particles c-10 (70 nm, amount of hydroxyl groups: $1.55 \times 10^{-2}$, 450 MPa, Cv value: 13%) Silane coupling agent-treated silica particles c-11 (95 nm, amount of hydroxyl groups: $1.60 \times 10^{-2}$, 450 MPa, Cv value: 10%) Silane coupling agent-treated silica particles c-12 (110 nm, amount of hydroxyl groups: $1.65 \times 10^{-2}$, 450 MPa, Cv value: 6%) Silane coupling agent-treated silica particles c-13 (120 nm, amount of hydroxyl groups: $1.69 \times 10^{-2}$, 450 MPa, Cv value: 4%) | | | 2 | 7 | 16 | 24 | | |
| Other particles | Silica particles a-7 (90 nm, amount of hydroxyl groups: $2.00 \times 10^{-1}$, 300 MPa, Cv value: 8%) MEK-AC-5140Z (85 nm, amount of hydroxyl groups: $2.5 \times 10^{-1}$, 280 MPa, Cv value: 16%) XX-242S (100 nm, amount of hydroxyl groups: 0, 1 MPa, Cv value; 16%) | 3 | | | | | | | |
| Others | IRGACURE 184 | 3 | 3 | 3 | 3 | 3 | 3 | 3 | 3 |
| | Ethanol | 141 | 141 | | | | | | |
| | MEK | | | 850 | 850 | 850 | 850 | 850 | 850 |
| Concentration of coating liquid | | 40.0% | 40.0% | 15.0% | 15.0% | 15.0% | 15.0% | 15.0% | 15.0% |
| Formulation ratio of particles and resin (Mass ratio) | | 22/78 | 25/75 | 51/49 | 51/49 | 53/47 | 55/45 | 62/38 | 68/32 |
| Frequency of fine particles having average primary particles of 50 nm or greater and less than 120 nm to fine particles having average primary particles of 120 nm to 250 nm | | 2 times | 2 times | 2 times | 2 times | 2 times | 2 times | 2 times | 2 times |

| | | C-18 | C-19 | C-20 | C-21 | C-22 | C-23 | C-24 |
|---|---|---|---|---|---|---|---|---|
| Polymerizable compound for forming binder resin | KAYARAD DPHA (Amount of hydroxyl groups: 1102) | 40 | 61 | 63 | 64 | 32 | 16 | 66 |
| Metal oxide particles | Baked silica particles b-1 (200 nm, amount of hydroxyl groups: $9.60 \times 10^{-2}$, 400 MPa, Cv value: 3.5%) Silane coupling agent-treated silica particles c-1 (210 nm, amount of hydroxyl groups: $4.32 \times 10^{-3}$, 450 MPa, Cv value: 3.7%) | 75 | 75 | 75 | 75 | 75 | 75 | 52 |
| | Baked silica particles b-7 (90 nm, amount of hydroxyl groups: $8.5 \times 10^{-2}$, 400 MPa, Cv value: 8%) Silane coupling agent-treated silica particles c-8 (15 nm, amount of hydroxyl groups: $1.00 \times 10^{-2}$, 450 MPa, Cv value: 20%) Silane coupling agent-treated silica particles c-9 (50 nm, amount of hydroxyl groups: $1.40 \times 10^{-2}$, 450 MPa, Cv value: 15%) Silane coupling agent-treated silica particles c-10 (70 nm, amount of hydroxyl groups: $1.55 \times 10^{-2}$, 450 MPa, Cv value: 13%) Silane coupling agent-treated silica particles c-11 (95 nm, amount of hydroxyl groups: $1.60 \times 10^{-2}$, 450 MPa, Cv value: 10%) Silane coupling agent-treated silica particles c-12 (110 nm, amount of hydroxyl groups: | | | | 8 | 40 | 56 | 7 |

TABLE 7-continued

| | | | | | | | | |
|---|---|---|---|---|---|---|---|---|
| | 1.65 × 10⁻², 450 MPa, Cv value: 6%) | | | | | | | |
| | Silane coupling agent-treated silica particles c-13 | 32 | | | | | | |
| | (120 nm, amount of hydroxyl groups: 1.69 × 10⁻², 450 MPa, Cv value: 4%) | | | | | | | |
| Other particles | Silica particles a-7 (90 nm, amount of hydroxyl groups: 2.00 × 10⁻¹, 300 MPa, Cv value: 8%) | | | | | | | |
| | MEK-AC-5140Z (85 nm, amount of hydroxyl groups: 2.5 × 10⁻¹, 280 MPa, Cv value: 16%) | | 11 | | | | | |
| | XX-242S (100 nm, amount of hydroxyl groups: 0, 1 MPa, Cv value; 16%) | | | 9 | | | | |
| Others | IRGACURE 184 | 3 | 3 | 3 | 3 | 3 | 3 | 3 |
| | Ethanol | | | | | | | |
| | MEK | 850 | 850 | 850 | 850 | 850 | 850 | 850 |
| Concentration of coating liquid | | 15.0% | 15.0% | 15.0% | 15.0% | 15.0% | 15.0% | 13.0% |
| Formulation ratio of particles and resin (Mass ratio) | | 73/27 | 55/45 | 54/46 | 56/44 | 78/22 | 89/11 | 47/53 |
| Frequency of fine particles having average primary particles of 50 nm or greater and less than 120 nm to fine particles having average primary particles of 120 nm to 250 nm | | 2 times | 2 times | 2 times | 1 time | 5 times | 7 times | 2 times |

Respective compounds used are shown below.

MEK-AC-5140Z (manufactured by Nissan Chemical Industries, Ltd.): 40% MEK dispersion liquid of unbaked silica particles being modified with a methacryloyl group and having an average primary particle diameter of 85 nm XX-242S (manufactured by Sekisui Plastics Co., Ltd.): Cross-linked polymethyl methacrylate particles having an average primary particle diameter of 100 nm Antireflection films B-5 to B-6 were produced in the same method as the antireflection films B-1 to B-4.

Antireflection films C-12 to C-24 were produced in the same method as the antireflection films C-1 to C-11.

(Evaluation of Antireflection Film)

Various characteristics of the antireflection films were evaluated by methods below. Results thereof are provided in Table 8.

TABLE 8

| Antireflection film | B/A | Integral reflectivity | Durability of moth eye structure with respect to pressure in thickness direction | Haze | |
|---|---|---|---|---|---|
| B-2 | 0.60 | 0.4% | B | 0.8% | Example |
| B-5 | 0.60 | 0.3% | B | 0.5% | Example |
| B-6 | 0.60 | 0.3% | B | 0.5% | Example |
| C-12 | 0.65 | 1.0% | A | 0.8% | Example |
| C-13 | 0.65 | 1.0% | A | 0.8% | Example |
| C-14 | 0.65 | 0.8% | A | 0.6% | Example |
| C-15 | 0.70 | 0.6% | A | 0.5% | Example |
| C-16 | 0.70 | 0.5% | A | 0.5% | Example |
| C-17 | 0.70 | 0.6% | A | 0.5% | Example |
| C-18 | 0.60 | 1.0% | A | 0.5% | Example |
| C-19 | 0.60 | 1.0% | A | 0.6% | Example |
| C-20 | 0.60 | 1.0% | A | 1.8% | Example |
| C-21 | 0.65 | 1.0% | A | 0.8% | Example |
| C-22 | 0.70 | 0.5% | A | 0.5% | Example |
| C-23 | 0.55 | 0.5% | A | 1.2% | Example |
| C-24 | 0.75 | 0.3% | A | 0.5% | Example |

If the samples B-2, B-5, and B-6 of the examples were compared, it was understood that, reflectivity and haze become better, and dispersibility of fine particles of 200 nm was improved, if fine particles having an average primary particle diameter of 50 nm or greater and less than 120 nm were combined with fine particles having an average primary particle diameter of 200 nm. If the samples C-12 to C-18 of the examples were compared, it was understood that, even in a case of having a hard coat layer, if fine particles having an average primary particle diameter of 50 nm or greater and less than 120 nm were combined with fine particles having an average primary particle diameter of 210 nm, reflectivity and haze become better and, when the particle diameter thereof was 70 to 110 nm, reflectivity and haze were particularly excellent. If these and the samples C-19 and C-20 of the examples were compared, it was understood that, reflectivity and haze were excellent. As a result, it was understood that, a case where amounts of the hydroxyl groups of the surface of fine particles of 210 nm and fine particles of 50 nm or greater and less than 120 nm and baking conditions were caused to be substantially the same had a higher effect of suppressing agglomeration compared with a case of using others. If the samples C-16 and C-21 to C-23 of the examples were compared, it was understood that a frequency of the fine particles of 50 nm or greater an less than 120 nm to the fine particles of 120 to 250 nm was most excellently 2 times to 5 times.

INDUSTRIAL APPLICABILITY

According to the first embodiment of the invention, with respect to an antireflection film having a moth eye structure on a surface, it is possible to provide an antireflection film in which pencil hardness in a moth eye structure is high and particles do not fall out even if strong stress was applied to the moth eye structure, a polarizing plate, a cover glass, and an image display device that include this antireflection film, and a method for producing an antireflection film.

According to the second embodiment of the invention, it is possible to provide an antireflection film having a moth eye structure on a surface, in which durability against pressure with respect to the moth eye structure in a thickness direction is high, reflectivity is low, and haze is low, a polarizing plate, a cover glass, and an image display device that include this antireflection film, and a method for producing an antireflection film.

The invention is described above in detail with reference to specific embodiments, but it is obvious to a person skilled in the art that various changes or modifications can be performed without departing from the gist and the range of the invention.

The present application is based on Japanese patent application (JP2014-074785) filed on Mar. 31, 2014, Japanese patent application (JP2014-074784) filed on Mar. 31, 2014, Japanese patent application (JP2015-008713) filed on Jan. 20, 2015, and Japanese patent application (JP2015-060079) filed on Mar. 23, 2015, and the contents thereof are incorporated herein as references.

EXPLANATION OF REFERENCES

1: substrate
2: antireflection layer
3: metal oxide particles
4: binder resin
10: antireflection film
A: distance between peaks of adjacent convex portions
B: distance between a center between peaks of the adjacent convex portions and a concave portion

What is claimed is:

1. An antireflection film, comprising:
a substrate; and
an antireflection layer formed with a composition for forming an antireflection layer containing the following (A) and at least one of (B) or (C),
wherein the antireflection layer comprises a binder resin comprising at least one of a structure derived from the following (B) or a structure derived from the following (C) and has a moth eye structure having an irregular shape formed with metal oxide particles of the following on a surface on a side opposite to an interface on the substrate side, and
in the irregular shape of the antireflection layer, B/A which is a ratio between a distance A between peaks of adjacent convex portions and a distance B between a center between peaks of the adjacent convex portions and a concave portion is 0.5 or greater:
(A) metal oxide particles having hydroxyl groups on surfaces thereof and having an average primary particle diameter of 50 nm to 380 nm,
(B) a compound having a (meth)acryloyl group as a polymerizable group or a polymerizable group that is constituted from only atoms selected from hydrogen atoms, carbon atoms, nitrogen atoms and oxygen atoms and is other than a (meth)acryloyl group, having three or more polymerizable groups in one molecule, and having a weight-average molecular weight of 1,000 or less, and
(C) a compound having a (meth)acryloyl group, having a silicon atom to which at least one of a hydroxyl group and a hydrolyzable group is directly bonded, and having a weight-average molecular weight of 300 to 1,000,
wherein indentation hardness of the metal oxide particles is 400 MPa or greater.

2. The antireflection film according to claim 1,
wherein the compound (C) is a compound having four or more carbon atoms between a carbon atom that constitutes a carbonyl group in the (meth)acryloyl group and the silicon atom to which at least one of a hydroxyl group and a hydrolyzable group is directly bonded.

3. The antireflection film according to claim 1,
wherein a ratio of the number of (meth)acryloyl groups to the number of the silicon atoms to which at least one of a hydroxyl group and a hydrolyzable group is directly bonded in the compound (C) is 1.1 to 3.0.

4. The antireflection film according to claim 1,
wherein the compound (C) is a compound having a urethane bond between a carbon atom constituting a carbonyl group in the (meth)acryloyl group and the silicon atom to which at least one of a hydroxyl group and a hydrolyzable group is directly bonded.

5. The antireflection film according to claim 1,
wherein the metal oxide particles (A) are metal oxide particles that are surface-modified with a compound having a (meth)acryloyl group.

6. The antireflection film according to claim 1,
wherein the metal oxide particles (A) in the composition for forming the antireflection layer are surface-modified with the compound (C).

7. The antireflection film according to claim 1,
wherein the metal oxide particles are silica particles.

8. The antireflection film according to claim 1,
wherein the metal oxide particles are baked silica particles.

9. A polarizing plate comprising:
a polarizer; and
at least one protective film that protects the polarizer,
wherein at least one of the at least one protective film is the antireflection film according to claim 1.

10. A cover glass comprising:
the antireflection film according to claim 1 as a protective film.

11. An image display device comprising:
the antireflection film according to claim 1.

12. An antireflection film comprising:
a substrate; and
an antireflection layer containing a binder resin and metal oxide particles having an average primary particle diameter of 50 nm to 250 nm,
wherein, in a surface of the metal oxide particles, an amount of hydroxyl groups is $1.00 \times 10^{-1}$ or less,
indentation hardness of the metal oxide particles is 400 MPa or greater,
the binder resin is a resin having a hydroxyl group, and
the antireflection layer has a moth eye structure having an irregular shape formed with the metal oxide particles on a surface on a side opposite to an interface on the substrate side.

13. The antireflection film according to claim 12,
wherein in the irregular shape of the antireflection layer, B/A which is a ratio between a distance A between peaks of adjacent convex portions and a distance B between a center between peaks of the adjacent convex portions and a concave portion is 0.5 or greater.

14. The antireflection film according claim 13,
wherein a half-width of the distance A in distribution is 200 nm or less.

15. The antireflection film according to claim 12,
wherein only metal oxide particles having a primary particle diameter of 50 nm to 250 nm, as the metal oxide particles are contained.

16. The antireflection film according to claim 12,
wherein the metal oxide particles are silica particles.

17. The antireflection film according to claim 12,
wherein the metal oxide particles are baked silica particles.

18. The antireflection film according to claim 12,
wherein the metal oxide particles are baked silica particles that are surface-modified with a compound having a (meth)acryloyl group.

19. The antireflection film according to claim 12,
wherein the binder resin is a resin obtained by polymerizing a polymerizable compound having at least one of a group having an ethylenically unsaturated double bond and an epoxy group, as a polymerizable group.

20. The antireflection film according to claim 19,
wherein a hydroxyl group equivalent of one molecule of the polymerizable compound is 1 to 10,000.

21. A polarizing plate comprising:
a polarizer; and
at least one protective film that protects a polarizer,
wherein at least one of the at least one protective film is the antireflection film according to claim 12.

22. A cover glass comprising:
the antireflection film according to claim 12, as a protective film.

23. An image display device comprising:
the antireflection film according to claim 12.

24. The antireflection film according to claim 12,
wherein both of metal oxide particles having an average primary particle diameter of 120 nm to 250 nm and metal oxide particles having an average primary particle diameter of 50 nm or greater and less than 120 nm, as the metal oxide particles are contained.

25. The antireflection film according to claim 24,
wherein, in the metal oxide particles having an average primary particle diameter of 50 nm or greater and less than 120 nm, an amount of hydroxyl groups is $1.00 \times 10^{-1}$ or less, and indentation hardness is 400 MPa or greater.

26. The antireflection film according to claim 24,
wherein, in the metal oxide particles having an average primary particle diameter of 50 nm or greater and less than 120 nm, an amount of hydroxyl groups is greater than $1.00 \times 10^{-1}$, or indentation hardness is less than 400 MPa.

* * * * *